United States Patent
Hayakawa

(10) Patent No.: US 8,970,623 B2
(45) Date of Patent: Mar. 3, 2015

(54) INFORMATION PROCESSING SYSTEM, INFORMATION PROCESSING METHOD, INFORMATION PROCESSING DEVICE AND TANGIBLE RECODING MEDIUM RECORDING INFORMATION PROCESSING PROGRAM

(75) Inventor: Takeshi Hayakawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 62 days.

(21) Appl. No.: 13/402,533

(22) Filed: Feb. 22, 2012

(65) Prior Publication Data

US 2012/0218299 A1 Aug. 30, 2012

(30) Foreign Application Priority Data

Feb. 25, 2011 (JP) ................... 2011-040980

(51) Int. Cl.
*G09G 5/00* (2006.01)
*A63F 13/20* (2014.01)

(52) U.S. Cl.
CPC ........... *A63F 13/06* (2013.01); *A63F 2300/105* (2013.01); *A63F 2300/1087* (2013.01); *A63F 2300/1093* (2013.01); *A63F 2300/204* (2013.01);
(Continued)

(58) Field of Classification Search
CPC ................. G06T 19/00; G06T 7/0044; G06T 2207/30204; G06F 3/0346; G06F 3/04815; G06F 3/005; A63F 13/06; A63F 13/00; A63F 2300/1031
USPC ........................... 345/156, 632, 633, 419, 7, 8
See application file for complete search history.

(56) References Cited

U.S. PATENT DOCUMENTS

| | | | |
|---|---|---|---|
| 6,972,734 B1 * | 12/2005 | Ohshima et al. | 345/8 |
| 2003/0062675 A1 | 4/2003 | Noro et al. | |
| 2011/0216060 A1 * | 9/2011 | Weising et al. | 345/419 |

(Continued)

FOREIGN PATENT DOCUMENTS

| | | |
|---|---|---|
| JP | 2000-322602 | 11/2000 |
| JP | 2002-247602 | 8/2002 |
| JP | 2005-251118 | 9/2005 |

OTHER PUBLICATIONS

Henrysson et al. "Face to Face Collaborative AR on Mobile Phones", Proceedings of the International Symposium on Mixed and Augmented Reality; Fourth IEEE, Oct. 2005, 9 pages.

(Continued)

*Primary Examiner* — Chante Harrison
(74) *Attorney, Agent, or Firm* — Nixon & Vanderhye P.C.

(57) ABSTRACT

An example information processing system which includes a plurality of information processing devices, the respective information processing devices carrying out imaging by an imaging device, wherein the respective information processing devices include: an imaging processing unit to generate a captured image by sequentially capturing images of a real space; a virtual space setting unit to set a virtual space commonly used by another information processing device which captures an image of one of an imaging object that is included in a captured image, and an imaging object, at least a portion of external appearance of which matches the imaging object, based on at least the portion of the imaging object included in the captured image; and a transmission unit to send data relating to change in a state of the virtual space, to the other information processing device, when the change in the state of the virtual space is detected.

14 Claims, 25 Drawing Sheets

(52) U.S. Cl.
CPC . *A63F 2300/6045* (2013.01); *A63F 2300/6676* (2013.01); *A63F 2300/69* (2013.01)
USPC .......................................... 345/632; 345/633

(56) References Cited

U.S. PATENT DOCUMENTS

2012/0293549 A1* 11/2012 Osako ........................... 345/633
2013/0169682 A1* 7/2013 Novak et al. .................. 345/633
2013/0215148 A1* 8/2013 Antonyuk et al. ............. 345/633
2013/0222425 A1* 8/2013 Kato .............................. 345/632
2013/0234934 A1* 9/2013 Champion et al. ............ 345/156
2013/0235079 A1* 9/2013 Reitan, Dan .................. 345/633

OTHER PUBLICATIONS

Jul. 5, 2013 European Search Report for EP 12155781.3, 8 pages.

* cited by examiner

FIG.10

| CONDITION ID | CONDITION | ACTION |
|---|---|---|
| 1 | OVERLAPS WITH ENEMY MARKER | START A FIGHT |
| 2 | SEPARATED FROM MARKER OF FALLEN ENEMY | FALLEN ENEMY OBJECT IS DISPLAYED IN A FALLEN STATE |
| 3 | POSITIONED ON SQUARE ADJACENT TO HOUSE MARKER | CHARACTER COMES OUT FROM HOUSE |
| 4 | OVERLAPS WITH HOUSE MARKER | PHYSICAL STRENGTH RESTORING |
| 5 | ENTERS INTO RANGE WITHIN 2 SQUARES FROM ENEMY MARKER | ENEMY MOVES OUT |
| 6 | MOVES OUT FROM RANGE WITHIN 2 SQUARES FROM ENEMY MARKER | HALT THE ENEMY THAT WAS MOVING |
| 7 | SEPARATED FROM FIELD WHERE A SEED HAS BEEN SOWN | GROWTH (PASSAGE OF TIME), SPROUT → FLOWER → FRUIT, WITH EACH SQUARE |
| 8 | THERE ARE A PLURALITY OF MARKERS | SELECT THE CLOSEST MARKER |

FIG.13

| CONDITION ID | CONDITION | ACTION |
|---|---|---|
| 11 | TALK TO ASSISTANT CHARACTER | CHANGE ENEMY → STRENGTH RESTORING ITEM, TREE → LIFE POINT UP ITEM |
| 12 | CUT DOWN TREE | TREE CUT DOWN AND SURROUNDING TREES FALL DOWN |
| 13 | FIGHT ENEMY AND WIN | ENEMY CHARACTERS OF THE SAME TYPE ALSO FALL |
| 14 | FACING ENEMY | PAYED ATTENTION TO BY OTHER ENEMY |

FIG.16

| CONDITION ID | CONDITION | ACTION |
|---|---|---|
| 21 | OVERLAPPING WITH HOUSE MARKER | RESTORE STRENGTH OF PLAYER |
| 22 | OVERLAPPING WITH PLAYER | RAISE PLAYER LEVEL |
| 23 | POSITIONED ON SQUARE ADJACENT TO THE ENEMY SQUARE | DEFEND AGAINST ATTACK BY ENEMY |

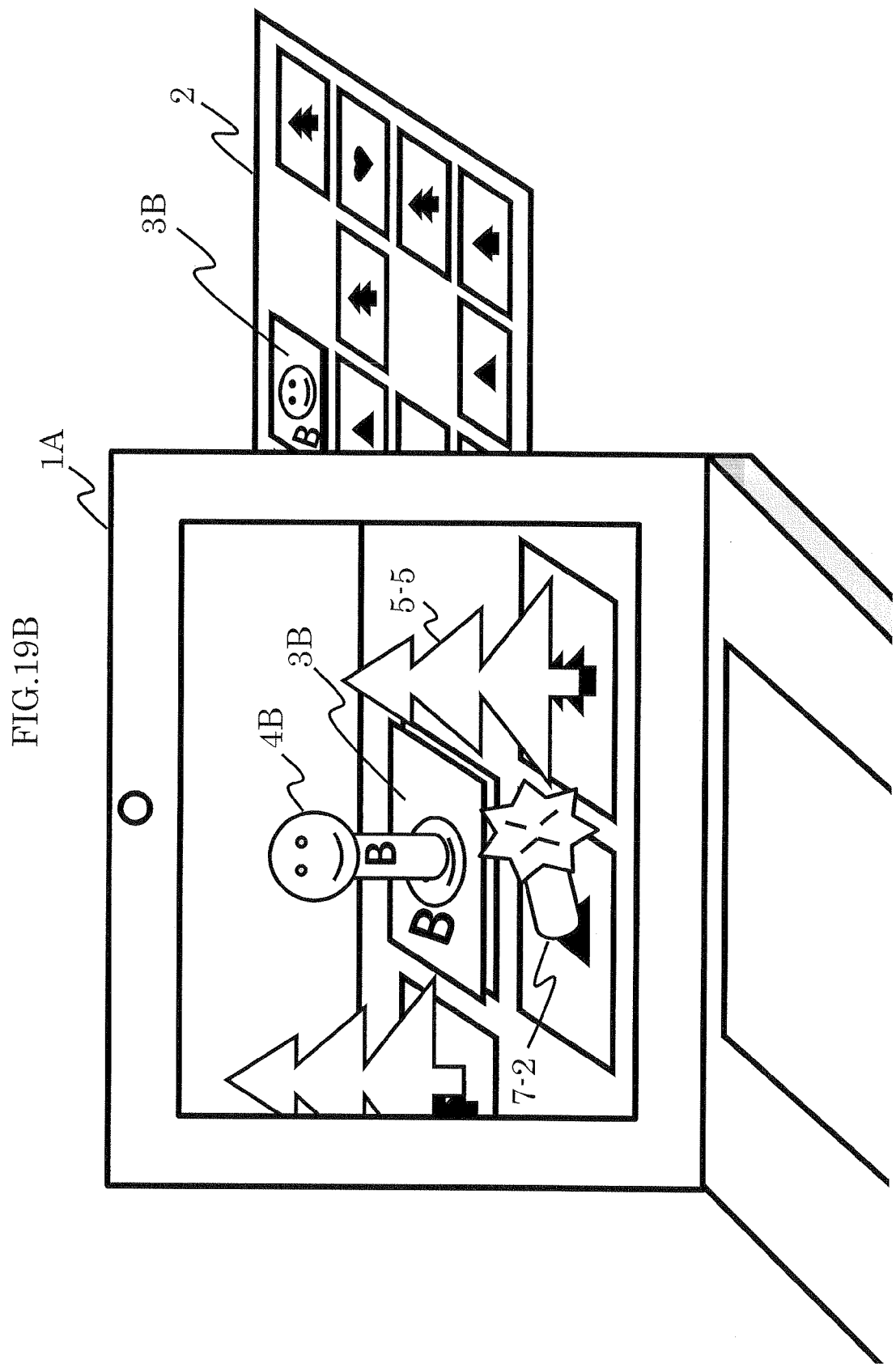

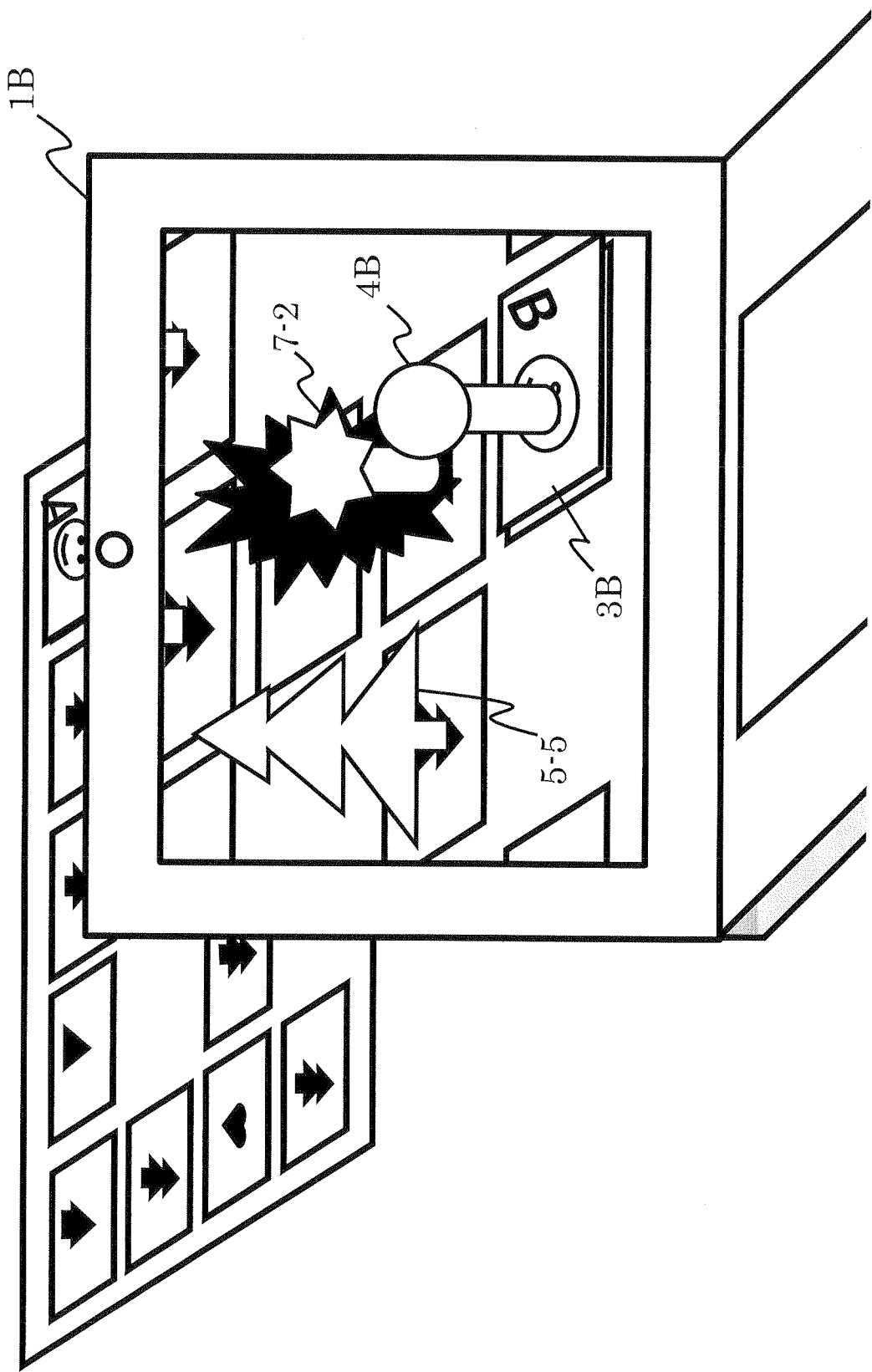

INFORMATION PROCESSING SYSTEM, INFORMATION PROCESSING METHOD, INFORMATION PROCESSING DEVICE AND TANGIBLE RECODING MEDIUM RECORDING INFORMATION PROCESSING PROGRAM

This application is based upon and claims the benefit of priority of the prior Japanese Patent Application No. JP2011-040980, filed on Feb. 25, 2011, the entire contents of which are incorporated herein by reference.

FIELD

The present disclosure relates to an information processing system, an information processing method, an information processing device, and a recording medium recording an information processing program, for developmental processing of information, images, and the like, to be displayed in a mutually superimposed fashion on a real world space.

BACKGROUND AND SUMMARY

When the real world is augmented by appending and displaying information of any kind in a real space, this is known as "augmented reality" (AR). One known AR technology is, for example, technology using a two-dimensional bar code which is printed on a card, for instance. This technology involves capturing an image of a two-dimensional bar code with a camera, identifying the two-dimensional bar code from the captured image in an image processing device, and displaying three-dimensional image data associated with the two-dimensional bar code on a display device, so as to be superimposed on the position of the two-dimensional bar code.

In conventional technology, processing by a single information processing device, such as an image processing device, is described, but there is no mention of the effects on a virtual space due to the exchange of information by a plurality of information processing devices.

One aspect of the present disclosure is an information processing system. The information processing system is an information processing system which includes a plurality of information processing devices, and in which the respective information processing devices carry out imaging by an imaging device. The respective information processing devices include: a imaging processing unit to generate a captured image by sequentially capturing images of a real space by an imaging device; a virtual space setting unit to set a virtual space commonly used by another information processing device which captures an image of one of an imaging object that is included in a captured image generated by the imaging processing unit, and an imaging object, at least a portion of an external appearance of which matches the imaging object, on the basis of at least the portion of the imaging object included in the captured image; and a transmission unit to send data relating to change in a state of a virtual space set by the virtual space generating unit, to the other information processing device, when the change in the state of the virtual space is detected.

By sending data relating to change in a state of a virtual space set by the virtual space generating unit, to the other information processing device, if a change in the state of the virtual space is detected, then the other information processing device is able to acquire change in the state of the virtual space. For example, it is possible to detect change in the state of the virtual space in cases where the other information processing device has not detected change in the state of the virtual space. Moreover, for example, in cases where the other information processing device has detected change in the state of the virtual space, it is possible to check the consistency with the change of the virtual space detected by the other information processing device. Consequently, according to the information processing system according to the present disclosure, it is possible to improve consistency between a plurality of information processing devices, in respect of change in the state of the virtual space. Furthermore, it is possible to share change in the state of the virtual space which corresponds to a real space, without contradictions, between respective users of a plurality of information processing devices, and therefore it is possible to achieve common enjoyment and a sense of unity, between the respective users.

In an information processing system which is one aspect of the present disclosure, the transmission unit of each information processing device may include a state change judging unit to judge whether or not the state of the virtual space set by the virtual space setting unit has changed from a previously set state, and may send data relating to the change in the state of the virtual space, to the other information processing device, when the state of the virtual space is judged to change by the state change judging unit. Because of this, when the settings of the virtual space have changed from a state of previous time, it is possible to send data relating to the change in the state of the virtual space, to the other information processing device, and consistency between a plurality of information processing devices is improved in respect of the change in the state of the virtual space.

An information processing system which is one aspect of the present disclosure further includes a marker which is present in a real space and has a shape enabling detection of a position and an attitude at the position. Moreover, the respective information processing devices may further include: a detection unit to detect the position and attitude of the marker in the captured image generated by the imaging processing unit, wherein the virtual space setting unit may generate the virtual space based on at least the position and attitude of the marker detected by the detection unit; and the transmission unit may, when the position or attitude of the marker change and the change in the state of the virtual space set by the virtual space setting unit is detected, send data relating to the change in the state of the virtual space, to the other information processing device. The change in the state of the virtual space due to change in the position or attitude of the marker is detected by an information processing device which captures an image of the marker. In this case, the information processing device which detects change in the state of the virtual space sends data relating to the change in the state of the virtual space, and therefore it is possible to confirm consistency between devices in respect of the state of the virtual space after change. Furthermore, even an information processing device which does not capture an image of the marker is able to detect change in the state of the virtual space due to movement of the marker, since that device receives data relating to change in the state of the virtual space, from the information processing device which detects change in the state of the virtual space due to movement of the marker.

In an information processing system which is one aspect of the present disclosure, the transmission unit of each information processing device may, when change in the state of the virtual space set by the virtual space setting unit is detected due to the change in the position or attitude of the marker, send data relating to change in the position and attitude of the marker to the other information processing device. Because of this, in cases where there is change in the virtual space due to change in the position or attitude of the marker, it is possible to send details of the change in the position or attitude of the marker, to the other information processing device.

In an information processing system which is one aspect of the present disclosure, the virtual space setting unit of each information processing device may include display processing unit to superimpose predetermined data on the captured image and to display the image on the display device at a position corresponding to the marker based on the attitude of the marker. Because of this, it is possible to superimpose predetermined data corresponding to the marker on the captured image, and the virtual space is made more exciting.

In an information processing system which is one aspect of the present disclosure, the respective information processing devices may further include a reception unit to receive data relating to the change in the state of the virtual space sent from the other information processing device, wherein the virtual space setting unit may generate the virtual space also based on data relating to the change received by the reception unit. By this means, it is possible for the information processing device to detect change in the state of the virtual space that is not detected by the information processing device itself, and to reflect this change in the virtual space set by the information processing device itself. Accordingly, it is possible to improve consistency between a plurality of information processing devices, in respect of change in the state of the virtual space.

In an information processing system which is one aspect of the present disclosure, the respective information processing devices may further include: a reception unit to receive data relating to the change in the position and attitude of the marker from the other information processing device, wherein the display processing unit may change and display the state of the predetermined data, based on data relating to the position and attitude of the marker received by the reception unit. By this means, the information processing device which receives data relating to the position and attitude of the marker is able to display the predetermined data in a state which is consistent with the predetermined data which is displayed on the display device of the information processing device that sent the data.

In an information processing system which is one aspect of the present disclosure, the respective information processing devices may further include: an operational input acceptance unit to accept an operational input from a user, wherein the virtual space setting device may generate a virtual space based on the operational input also. The change in the state of the virtual space due to an operational input to the information processing device from the user is detected by the information processing device which receives the operational input. Therefore, the information processing device which detects change in the state of the virtual space due to an operational input reports the change in the state of the virtual space to the other information processing device, whereby an information processing device which does not identify change in the state of the virtual space due to an operational input to an information processing device by the user is also able to detect the change in the state of the virtual space. By this means, it is possible to improve consistency between a plurality of information processing devices, in respect of change in the state of the virtual space.

In an information processing system which is one aspect of the present disclosure, the transmission unit of each information processing device may send data relating to the change in the state of the virtual space to the other information processing device, without routing via a relay device. By this means, for instance, it is possible for information processing devices which are located within a range of several meters of each other, to communicate directly. Furthermore, since this communication is not routed via a server or an access point, then unessential procedures, and the like, do not occur and communication between the information processing devices is used freely.

Moreover, the present disclosure may be a method, system, information processing device or a program recorded on a recording medium which is read by a computer or other device or machine. Here, the recording medium which is read by the computer, or the like, is a recording medium on which information such as data or a program is stored by an electrical, magnetic, optical, mechanical or chemical action, and from which information is read by a computer, or the like.

For example, one aspect of the present disclosure is an information processing method executed by each of a plurality of information processing devices included in a information processing system, the respective information processing devices carrying out imaging by an imaging device, the information processing method including: generating a captured image by sequentially capturing images of a real space by the imaging device; setting a virtual space commonly used by another information processing device which captures an image of one of an imaging object that is included in the generated captured image, and an imaging object, at least a portion of an external appearance of which matches the imaging object based on at least the portion of the imaging object included in the captured image; and sending data relating to change in a state of a virtual space, to the other information processing device, when the change in the state of the virtual space is detected.

Furthermore, for example, one aspect of the present disclosure is an information processing device, including: an imaging processing unit to generate a captured image by sequentially capturing images of a real space by an imaging device; a virtual space setting unit to set a virtual space commonly used by another information processing device which captures an image of one of an imaging object that is included in a captured image generated by the imaging processing unit, and an imaging object, at least a portion of an external appearance of which matches the imaging object based on at least a portion of the imaging object included in the captured image; and a transmission unit to send data relating to change in a state of a virtual space set by the virtual space setting unit, to the other information processing device, when the change in the state of the virtual space is detected.

Moreover, for example, one aspect of the present disclosure is a recording medium recording an information processing program which is executed by computers of respective information processing devices in an information processing system which includes a plurality of information processing devices, and in which the respective information processing devices carry out imaging by an imaging device. The information processing program is an information processing program which causes the respective computers to function as: a imaging processing unit to generate a captured image by sequentially capturing images of a real space by an imaging device; a virtual space setting unit to set a virtual space commonly used by another information processing device which captures an image of one of an imaging object that is included in a captured image generated by the imaging processing unit, and an imaging object, at least a portion of an external appearance of which matches the imaging object based on at least the portion of the imaging object included in the captured image; and a transmission unit to send data relating to change in a state of a virtual space set by the virtual space setting unit, to the other information processing device, when the change in the state of the virtual space is detected.

BRIEF DESCRIPTION OF THE DRAWINGS

FIG. 10 shows an example non-limiting condition information which defines first game development processing;

FIG. 13 shows an example of condition information which defines second game development processing;

FIG. 16 shows an example non-limiting condition information in the modification example;

FIG. 19B shows an example non-limiting screen display of a game device 1A after information consistency processing has been executed;

FIG. 21A shows an example non-limiting screen display of a game device 1B which captures images in an imaging range 50B, after information consistency processing has been executed;

DETAILED DESCRIPTION OF NON-LIMITING EXAMPLE EMBODIMENTS

<First Embodiment>
(Overview of Game System)

Figure 1:
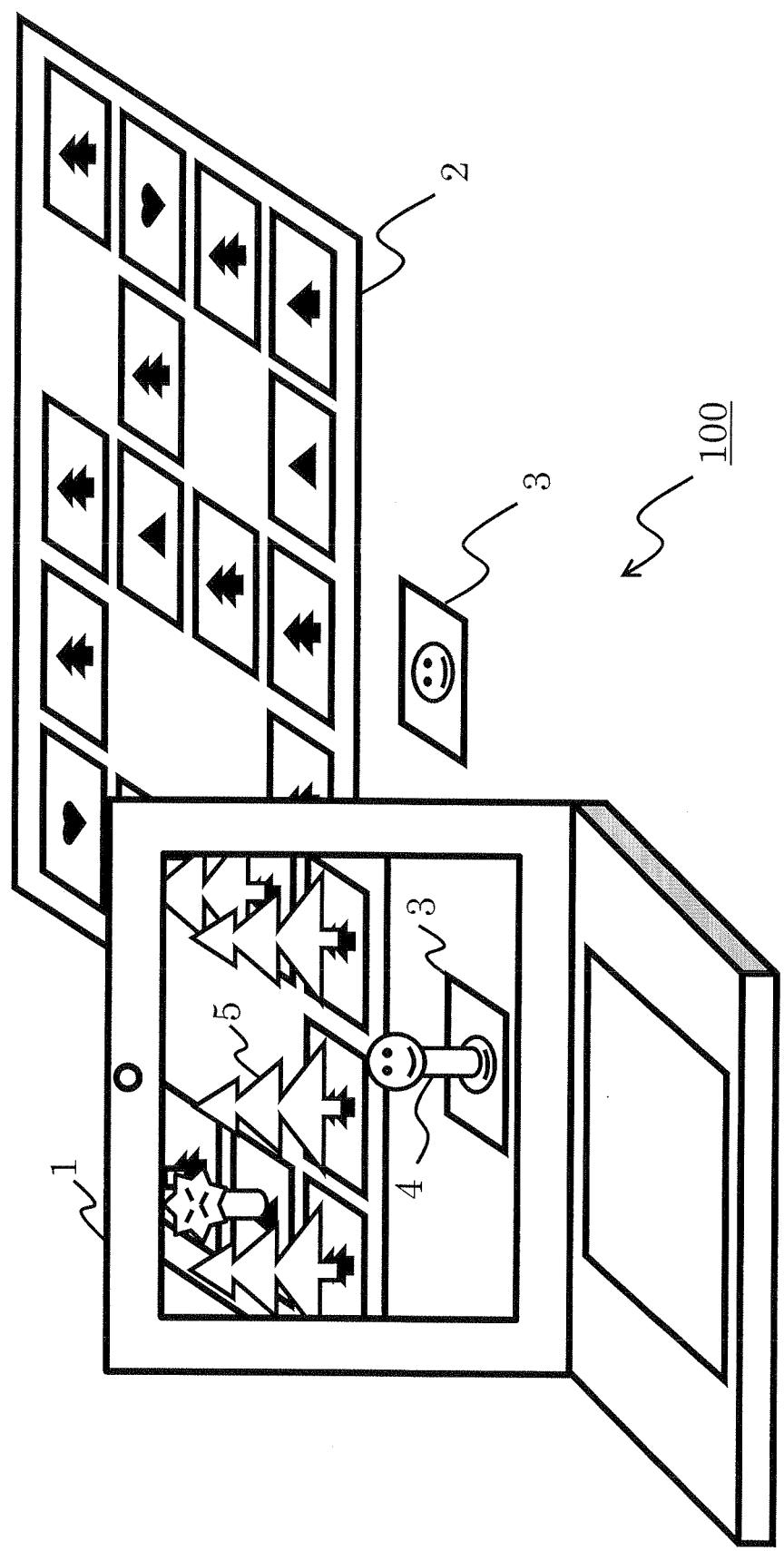
FIG. 1 shows an example non-limiting configuration of a game system.

FIG. 1 is a diagram illustrating an example of the composition of a game system.

The game system 100 includes a game device 1 which is equipped with an imaging device and a display device, aboard 2, and a player card 3.

The game system 100 provides a game which is played by moving, adding and removing a player card 3 on a board 2. Games provided by the game system 100 generally include games which are played by arranging objects in a two-dimensional or three-dimensional space. For example, games provided by the game system 100 may include: sugoroku (a Japanese dice-based board game), shogi, chess, go, and the like.

The game device 1 augments a real space which is captured by the imaging device, by superimposing objects which do not exist in the real space, and displays the augmented real space on the display device. In the first embodiment, a real space which is augmented by superimposing information is defined as a virtual space.

When change in the circumstances in the real space is captured, the game device 1 is also able to change the circumstances in the virtual space in accordance with the change in the real space. In this way, in the game system 100, a game is played in a virtual space which is generated by the game device 1 and displayed on the display device.

In the game system 100 illustrated in FIG. 1, when the board 2 and the player card 3 are captured by the game device 1, a virtual space which includes a player object 4 and a tree object 5, and the like, that are not present in the real space, is displayed on the screen of the game device 1. When the user operates a player card 3 (to move, add or remove the card, or the like) and a change on the board 2 is captured by the game device 1, then the game develops while changing the state of either the player object 4 or the tree object 5, or the like, which are displayed on the screen of the game device 1. An object which does not exist in the real space but is present in the virtual space displayed on the screen of the game device 1 is called a "virtual object" below. The virtual object is three-dimensional image data or moving image data which represents a game character, item, background, or the like. Furthermore, the virtual object may be two-dimensional image data or moving image data.

The board 2 is one arrangement region providing object which provides arrangement regions for the player card 3, and has a plurality of squares which are arrangement regions for the player card 3. The squares indicate a range of possible arrangement of the player card 3. The arrangement region providing object may be a sheet, such as paper or cloth, or a board, or the like, or the floor. The player card 3 is one component in the game system 100, and one arranged component which moves on the arrangement region providing object. The player card 3 indicates the position of the player in the game. Other than a card, the arranged item may also have a solid rectangular shape, round cylinder shape, or various other shapes. The player card 3 is arranged at any one of the plurality of squares on the board 2, by the user.

Symbols are printed on the squares on the board 2 and on the player card 3. These symbols are associated with virtual objects. The symbols are indicators which represent references of the display positions of the virtual objects corresponding to the respective symbols. Below, the symbols which represent the references of the display positions of the virtual objects are called "markers". Markers may not be printed on all of the squares on the board 2.

The virtual objects are displayed on the screen of the game device 1 in superimposed fashion at predetermined positions of the captured image in accordance with the corresponding markers. Furthermore, the virtual objects have a plurality of directions, namely, up/down, front/back, left/right. Therefore, a marker is formed by a symbol, text, figure, picture or a combination of these, or the like, which enables at least one of the plurality of directions, for example, the forward direction (front face) to be detected. In other words, a symbol, text, figure, picture or combination of these, which disables even one of the plurality of directions to be detected, are not to be employed as a marker. For example, a figure having point symmetry, such as a circle or rectangle is a shape which is not employed as a marker. Furthermore, the orientation of the marker is defined by at least one of the plurality of directions. For example, if the marker has a form which enables the forward direction to be detected, then the orientation of the marker is defined with reference to the forward direction which is detected from the form of the marker. Hereinafter, in the first embodiment, the marker is taken to indicate the front of the object. However, the direction indicated by a marker is not limited to the front of the object.

In the game system 100 illustrated in FIG. 1, for the sake of convenience, one game device 1 and one player card 3 are depicted, but the disclosure is not limited to this and there may be a plurality of game devices 1 and a plurality of player cards 3. Furthermore, a board 2 may be prepared respectively for each type of game, or a board which is used commonly in a plurality of games may be employed.

Figure 2:
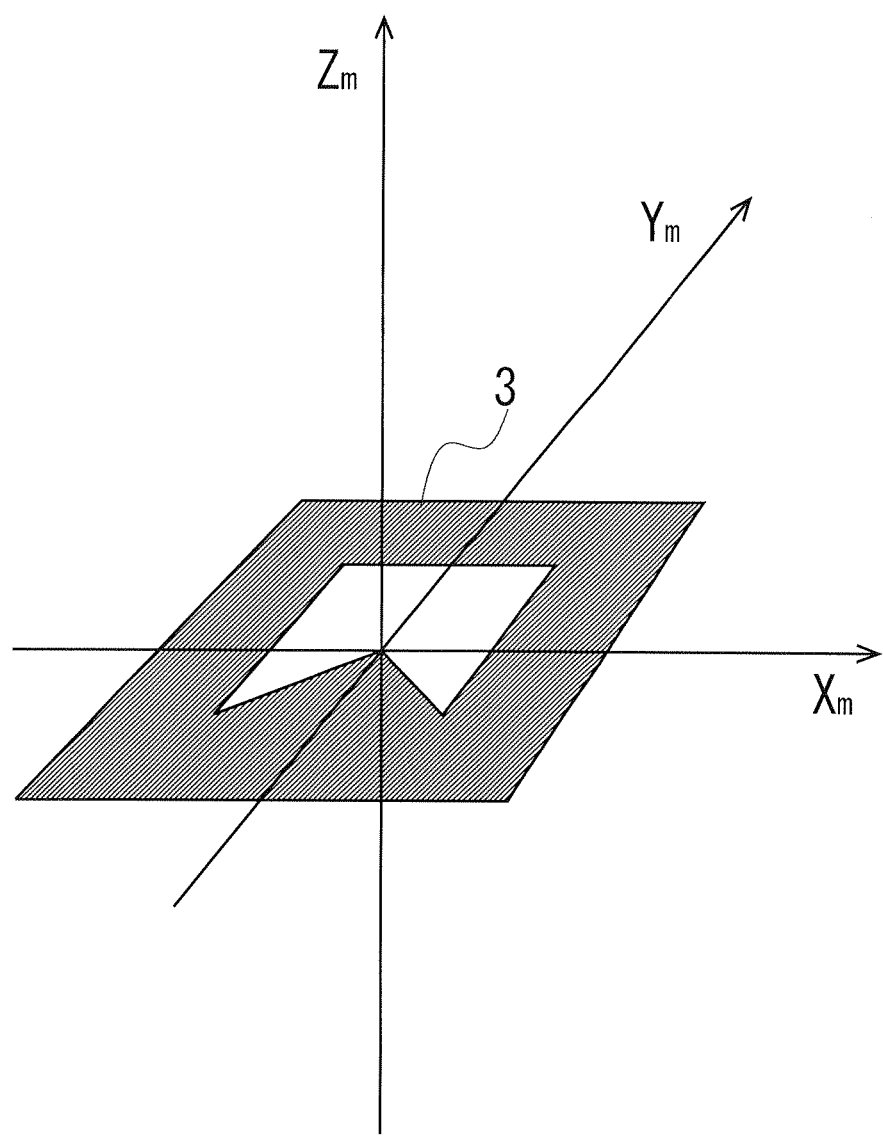
FIG. 2 shows an example non-limiting marker coordinates system (Xm, Ym, Zm) which is handled in the game system.

FIG. 2 is a diagram illustrating an example of a marker coordinates system (Xm, Ym, Zm) which is handled in the game system 100. The marker coordinates system is an orthogonal coordinates system which is defined by three mutually orthogonal axes, having a point of origin at the central point of the marker 3 (the marker on the player card 3, called "marker 3" below). The X axis and the Y axis of the marker coordinates system are defined on the plane where the marker 3 is attached, with the X axis being defined in the vertical direction (up and down direction) relative to the plane. Furthermore, the front/back and left/right of the marker 3 are defined; for example, the X axis is defined in the left/right direction and the Y axis is defined in the front/back direction. In this way, by defining the coordinates system of a virtual space with reference to a marker 3 which is situated in a real space, it is possible to associate the real space and the virtual space.

Furthermore, the marker coordinates system is defined with reference to respective markers 3. However, it is also possible to share use of one marker coordinates system between a plurality of markers 3. Note, the point of origin of a marker coordinates system may not be the central point of the marker 3. For example, any characteristic point of a marker 3 is used as the point of origin of the marker coordinates system. Furthermore, the method of defining the X axis, the Y axis and the Z axis is one example given in the present embodiment, and the X axis, Y axis and Z axis may be defined on the basis of another reference.

The game device 1 is able to detect a marker 3 included in the image, by carrying out image processing, such as pattern matching, for example, on an image captured by an outside left imaging unit 23a or an outside right imaging unit 23b (these are referred to simply as "outside imaging units 23" below). The game device 1 calculates on the basis of the detected marker the relative position and attitude of a marker 3 and the outside imaging units 23.

In the first embodiment, a virtual object which is arranged in the virtual space is arranged in the marker coordinates system of the marker 3 with which the virtual object is associated. The virtual object is rendered by capturing an image by the virtual camera which is arranged in the virtual space, and is displayed on a display monitor 22 of the game device 1. Here, the virtual camera serves to capture an image of the virtual space which is presented to the user. The position and attitude of the virtual camera in the marker coordinates system match the position and attitude of the outside imaging unit 23 in the real space. Therefore, the virtual space is defined on the basis of the marker 3, and when the position or imaging direction of the outside imaging unit 23 is changed in the virtual space, then the image of the virtual space displayed on the upper LCD 22 also changes.

(Composition of Game Device)

Figure 3:
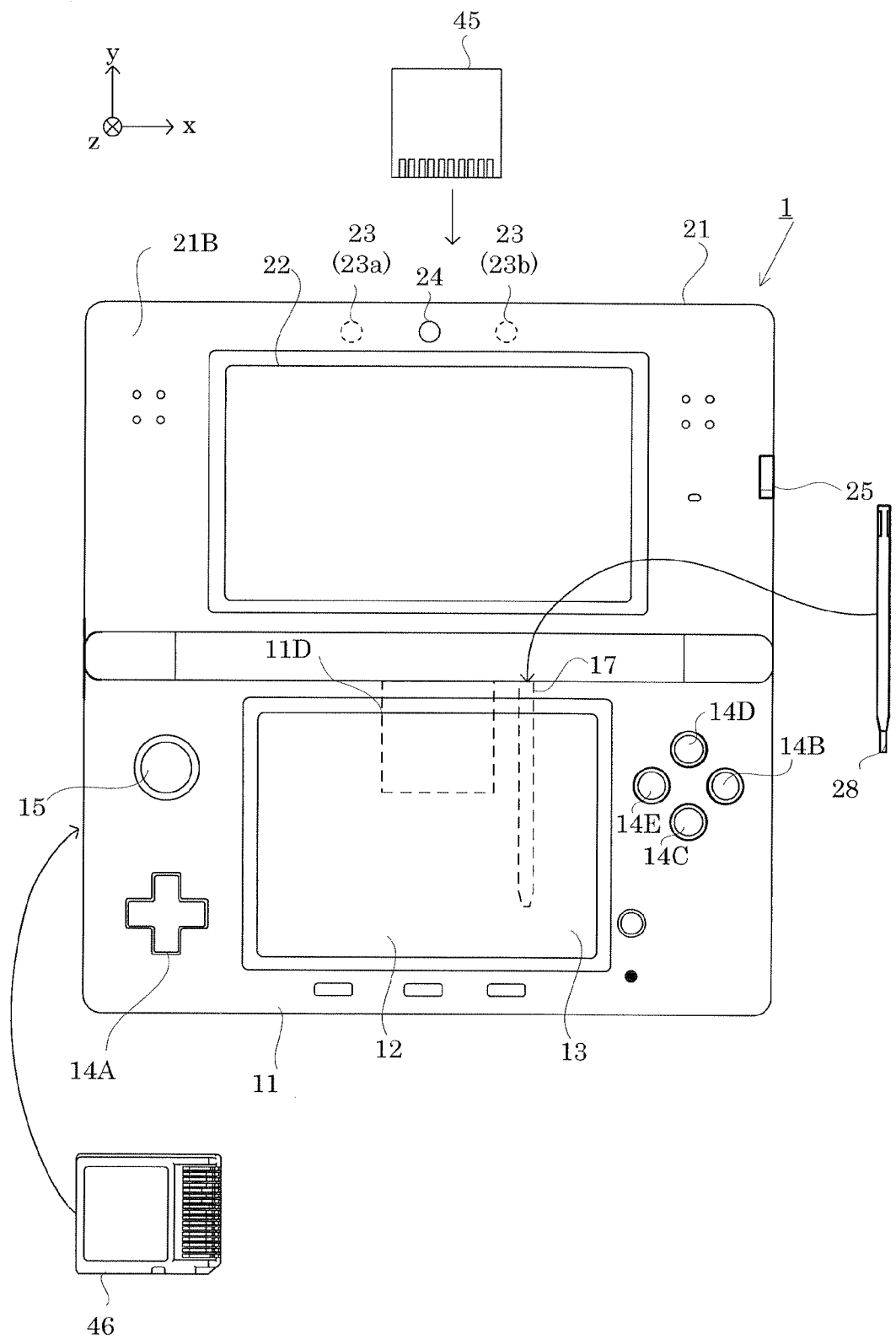
FIG. 3 shows an example non-limiting external diagram of a game device.

FIG. 3 is an example of an external diagram of the game device 1. The game device 1 has a lower housing 11 and an upper housing 21. The lower housing 11 and the upper housing 21 are coupled openably and closably (in a folding fashion) by means of a hinge structure.

A lower LCD(Liquid Crystal Display) 12, a touch panel 13, operating buttons 14A to 14E, an analog switch 15, an insertion hole 11D and an insertion hole 17 are provided in the lower housing 11.

The lower LCD 12 is a display device which displays an image in a planar fashion (not stereoscopically). The touch panel 13 is one of the input devices of the game device 1. A touch pen 28 which is used to make inputs to the touch panel 13 is accommodated by being inserted into the insertion hole 17 (indicated by the dotted lines in FIG. 3). However, the user may also use his or her finger, instead of the touch pen 28.

The operating buttons 14A to 14E are input devices for performing predetermined inputs. Functions corresponding to the program executed by the game device 1 are assigned appropriately to the buttons 14A to 14E. For example, the four-way button 14A is used for selection operations and character movement operations during a game, and the like. The operating buttons 14B to 14E, for example, are used for a setting operation or a canceling operation, or the like. The analog stick 15 is a device for indicating directions.

As to the insertion hole 11D (indicated by the dotted lines in FIG. 3), this insertion hole 11D is provided in order to insert an external memory 45 on which a game program is recorded.

An upper LCD 22, the outside left imaging unit 23a, the outside right imaging unit 23b, an inside imaging unit 24 and a 3D adjustment switch 25 are provided in the upper housing 21.

The upper LCD 22 is a display device capable of switching between a stereoscopic display mode which displays a stereoscopically viewable image and a planar display mode which displays an image in planar view (displays a planar image). This switching of the display mode is performed by means of a 3D adjustment switch 25.

The inside imaging unit 24 is an imaging unit having an imaging direction in an inward normal direction to the inner surface 21B of the upper housing 21. The outside left imaging unit 23a and the outside right imaging unit 23b are imaging units having imaging directions which are an outward normal direction from the outer surface, in the opposite direction to the inner surface 21B. The outside left imaging unit 23a and the outside right imaging unit 23b are referred to jointly below as the outside imaging unit 23.

An image captured by the inside imaging unit 24 or the outside imaging unit 23 is displayed on the upper LCD 22. Therefore, the plane including the screen of the upper LCD 22 corresponds to the imaging plane.

Figure 4:
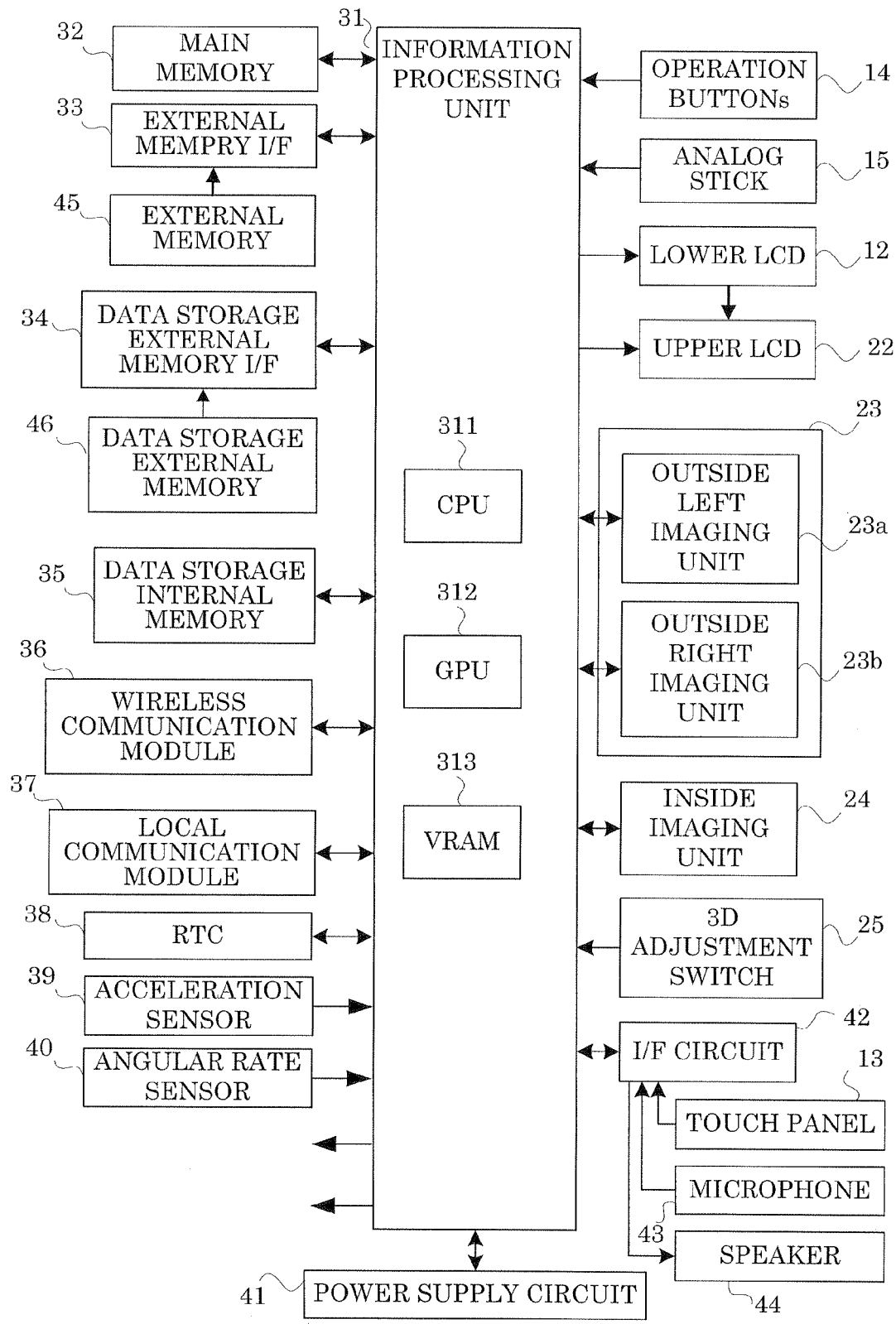
FIG. 4 shows an example non-limiting a block diagram of the internal composition of a game device.

FIG. 4 is a block diagram illustrating one example of the internal composition of the game device 1. The game device 1 includes, in addition to the constituent parts described above, electronic components, such as an information processing unit 31, a main memory 32, an external memory interface (external memory I/F) 33, an external data memory I/F 34, an internal data memory 35, a wireless communication module 36, a local communication module 37, a real-time clock 38, an acceleration sensor 39, an angular rate sensor 40, a power supply circuit 41 and an interface circuit (I/F circuit) 42, and the like. These electronic components are mounted on an electronic circuit board and are accommodated inside the lower housing 11 (or inside the upper housing 21).

The information processing unit 31 has a CPU (Central Processing Unit) 311 for executing a predetermined program and a GPU(Graphics Processing Unit) 312, VRAM(Video RAM) 313, and the like, for performing image processing. The CPU 311 executes predetermined processing by executing the predetermined program which is stored in a memory inside the game device 1 (for example, an external memory 45 connected to the external memory I/F 33 or the internal data memory 35). The program executed by the CPU 311 of the information processing unit 31 may be acquired from another device by means of communication with the other device. The GPU 312 of the information processing unit 31 generates an image in accordance with a command from the CPU 311 of the information processing unit 31 and renders the image in the VRAM 313. The image rendered in the VRAM 313 is output and displayed on the upper LCD 22 and/or the lower LCD 12.

The main memory 32, external memory I/F 33, external data memory I/F 34, and internal data memory 35 are connected to the information processing unit 31. The external memory I/F 33 is an interface for detachably connecting the external memory 45. Furthermore, the external data memory I/F 34 is an interface for detachably connecting the external data memory 46.

The main memory 32 is a volatile storage device which is used as a work area or buffer area of the information processing unit 31. In other words, the main memory 32 temporarily stores various data and temporarily stores a program acquired from an external source (the external memory 45, another device, or the like). In the first embodiment, a PSRAM (Pseudo-SRAM), for example, is used as the main memory 32.

The external memory 45 is a non-volatile storage medium for storing a program which is executed by the information processing unit 31. The external memory 45 is composed by a read-only semiconductor memory, for example. When the external memory 45 is connected to the external memory I/F 33, the information processing unit 31 is able to read a program stored in the external memory 45. Predetermined processing is carried out by executing the program read in by the information processing unit 31.

The external data memory 46 is a non-volatile rewriteable memory (for example, a NAND type flash memory), and is used to store predetermined data. For example, the external data memory 46 is an SD card. The internal data memory 35 is constituted by a non-volatile rewriteable memory (for example, a NAND type flash memory), and is used to store predetermined data. For example, data and programs downloaded by wireless communication via the wireless communication module 36 are stored in the external data memory 46 and the internal data memory 35.

The wireless communication module 36 and the local communication module 37 are connected to the information processing unit 31. The wireless communication module 36 has a function of connecting to a wireless LAN by a method conforming to the IEEE 802.11 b/g standard, for example. The information processing unit 31 uses the wireless communication module 36 to send and receive data to and from other devices via the Internet, and to perform direct wireless communication with other game devices 1 in IEEE 802.11 .b/g ad hoc mode. Furthermore, the local communication module 37 has a function of performing wireless communication with a game device of the same type, by means of a predetermined communication method (for example, infrared communication). The information processing unit 31 uses the local communication module 37 to send and receive data to and from another game device of the same type.

The acceleration sensor 39 is connected to the information processing unit 31. The acceleration sensor 39 determines the magnitude of acceleration (linear acceleration) in linear directions following three axial directions (the xyz axes). The acceleration sensor 39 is, for instance, an electrostatic capacitance type of acceleration sensor, but it is also possible to use an acceleration sensor based on another method. Furthermore, the acceleration sensor 39 may also be an acceleration sensor which determines acceleration in one axial direction or two axial directions. The information processing unit 31 receives data indicating the acceleration as determined by the acceleration sensor 39 (acceleration data), and calculates the attitude and movement of the game device 1.

The angular rate sensor 40 is connected to the information processing unit 31. The angular rate sensor 40 respectively determines the angular velocity produced about the three axes of the game device 1, and outputs data indicating the determined angular velocities (angular velocity data) to the information processing unit 31. The information processing unit 31 receives angular velocity data output from the angular rate sensor 40 and calculates the attitude and movement of the game device 1.

The RTC 38 and power supply circuit 41 are connected to the information processing unit 31. The RTC 38 outputs a time count to the information processing unit 31. The information processing unit 31 calculates a current time on the basis of the time measured by the RTC 38. The power supply circuit 41 controls the power from the power source of the game device 1 (the rechargeable battery accommodated in the lower housing 11) and supplies power to the respective components of the game device 1.

The I/F circuit 42 is connected to the information processing unit 31. The microphone 43, speakers 44 and touch panel 13 are connected to the I/F circuit 42. The microphone 43 detects the user's voice and outputs an audio signal to the I/F circuit 42. The speakers 44 amplify the audio signal from the I/F circuit 42 by means of an amplifier (not illustrated) and then output sound. The I/F circuit 42 includes an audio control circuit which controls the microphone 43 and the speakers 44, and a touch panel control circuit which controls the touch panel 13. The audio control circuit performs A/D conversion and D/A conversion of the audio signal, or converts the audio signal to audio data of a predetermined format. In the first embodiment, the touch panel 13 employs a resistance film type of touch panel. However, the touch panel 13 is not limited to a resistance film type and it is also possible to use a touch panel based on any press operation method, such as an electrostatic capacitance method, or the like. The touch panel control circuit generates touch position coordinates on the touch panel 13 of a predetermined format on the basis of a signal from the touch panel 13 and outputs the touch position coordinates to the information processing unit 31. The information processing unit 31 identifies the touch position where input has been made on the touch panel 13, by acquiring the touch position data.

The operating buttons 14 and the analog switch 15 are connected to the information processing unit 31, and operating data indicating the input status of the respective operating buttons 14A to 14E and the analog stick 15 is output to the information processing unit 31. The information processing unit 31 executes processing in accordance with the inputs to the operating buttons 14 and the analog stick 15, by acquiring operating data from the operating buttons 14 and the analog stick 15.

The lower LCD 12 and the upper LCD 22 are connected to the information processing unit 31. The lower LCD 12 and the upper LCD 22 display images in accordance with instructions from the information processing unit 31 (GPU 312). The lower LCD 12 is a display device which displays an image in a planar fashion (not stereoscopically). The number of pixels of the lower LCD 12 is 320 dot×240 dot (horizontal×vertical), for instance. In the first embodiment, an LCD is used as a display device, but it is also possible to use another display device, such as one using EL(Electro Luminescence), for example. Moreover, it is possible to use a display device having any resolution for the lower LCD 12.

The upper LCD 22 is a display device producing a display which is viewed stereoscopically with the naked eye. The upper LCD 22 employs a lenticular method or parallax barrier method in such a manner that a left-eye image and a right-eye image which are displayed alternatively in the horizontal direction are viewed separately by the left eye and the right eye, respectively. The number of pixels of the upper LCD 22 is 800 dot×240 dot (horizontal×vertical), for instance. In the first embodiment, the upper LCD 22 is described as being a liquid crystal device. However, it is not limited to this and a display device using EL, or the like, for example, may also be used. Furthermore, it is possible to use a display device of any resolution for the upper LCD 22.

The outside imaging unit 23 and the inside imaging unit 24 are connected to the information processing unit 31. The outside imaging unit 23 and the inside imaging unit 24 capture images in accordance with an instruction from the information processing unit 31, and output captured image data to the information processing unit 31.

The inside imaging unit 24 includes an imaging element having a predetermined resolution and a lens. The imaging element is, for example, a CCD image sensor, a CMOS image sensor, or the like. The lens may include a zoom mechanism.

The outside left imaging unit 23a and the outside right imaging unit 23b respectively include an imaging element having a predetermined common resolution (for example, a CCD image sensor or a CMOS image sensor, or the like), and a lens. The lens may include a zoom mechanism. As to the outside left imaging unit 23a and the outside right imaging unit 23b, either one of these two outside imaging elements (the outside left imaging unit 23a and the outside right imaging unit 23b) is used independently depending on the program executed by the game device 1. In the first embodiment, a case is described where either one of the outside imaging units 23 is used.

The 3D adjustment switch 25 is connected to the information processing unit 31. The 3D adjustment switch 25 sends an electric signal corresponding to the position of the slider to the information processing unit 31.

Figure 5:
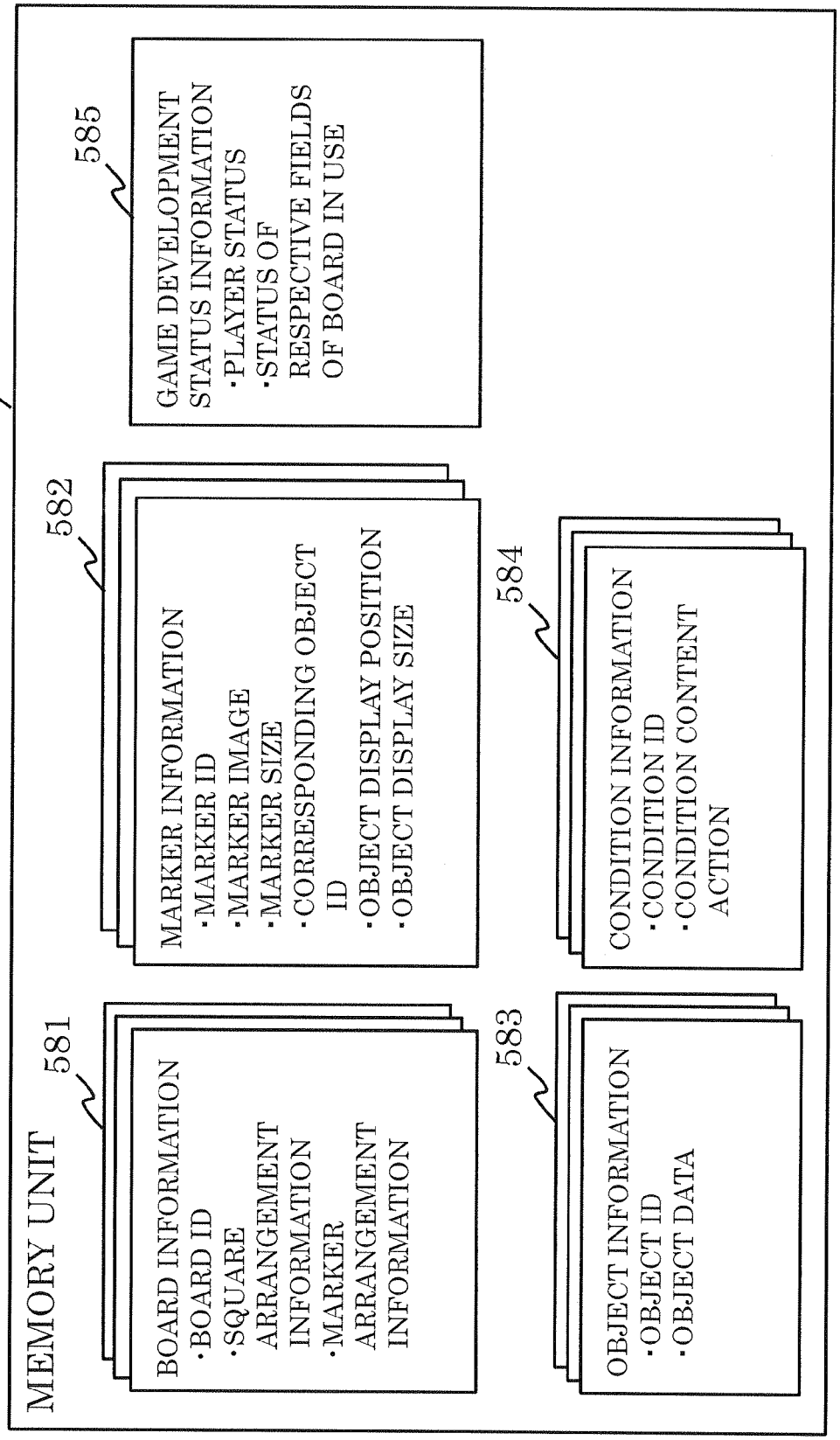
FIG. 5 shows an example non-limiting information held by a game device.

FIG. 5 is a diagram illustrating an example of information which is handled by the game device 1. The game device 1 handles board information 581, marker information 582, object information 583, condition information 584 and game development status information 585. These information elements are held in the memory unit 58, which is described hereinafter.

The board information 581 is information relating to a board used in a game which is provided by the game system 100. The board information 581 includes a board ID for identifying a board, square arrangement information, and marker arrangement information. The square arrangement information is information indicating an arrangement of squares on the board. Furthermore, the marker arrangement information is information indicating an arrangement of markers, and includes information about squares having a marker and the type of marker situated at that square. If there are a plurality of games which are provided by the game system 100 and if there are a plurality of boards which are used in the game system 100, then there is board information 581 for each respective board.

By way of example, square arrangement information and marker arrangement information are described for a case where the board 2 is divided into M square fields of a predetermined size horizontally and N square fields of a predetermined size vertically. The field is a range obtained by simply dividing up the board 2. Furthermore, it is possible to arrange one square in one field. Squares are not always arranged in all of the fields, and there may be cases where squares are not arranged in a portion of the fields. An identification number ij consisting of a row number i ($0 \leq i \leq M$) and a column number j ($0 \leq j \leq N$) is assigned to each field. In cases of this kind, the square arrangement information consists of the identification numbers of fields where squares are arranged. Furthermore, the marker arrangement information consists of associations between the identification numbers of fields where markers are present and marker IDs which are identification information for the markers that are printed on the fields. Since the markers are arranged in fields where squares are arranged, then there is partial duplication between the identification numbers of the fields included in the square arrangement information and the identification information of the fields included in the marker arrangement information. Furthermore, in this case, it is possible to include a field size (horizontal and vertical dimensions) in the board information 581.

The marker information 582 is information relating to markers. The marker information 582 includes, for example, a marker ID for identifying the marker, marker image data, a marker size, a corresponding object ID, a virtual object display position, an object display size, and the like. The marker size means the vertical and horizontal dimensions of the marker. The marker image data is image data of a marker which is printed on the board 2. The game device 1 uses the marker image data to detect a marker from a captured image. Furthermore, the game device 1 is able to acquire the position and attitude of the imaging device and the marker, and the like, in other words, the marker coordinates system, from the appearance of a marker included in the captured image, on the basis of the marker image data and the marker size. The corresponding object ID is the identification number of a virtual object which is displayed at a position corresponding to the marker. It is possible to associate a plurality of virtual objects with one marker, and in this case, a plurality of corresponding object IDs are included in the marker information 582. The virtual object display position is the position where the reference point of the virtual object is arranged. The position of the reference point of the virtual object may be indicated by coordinates in the marker coordinates system, for example. Furthermore, the display position of the virtual object may also include an angle, such as the inclination of the virtual object with respect to the marker. The display size of the object is the vertical and horizontal dimensions of the virtual object. These dimensions of the virtual object are dimensions which correspond to the same size as the marker, for example, and therefore if a virtual object is displayed on the upper LCD 22, then the size of the virtual object is adjusted in accordance with the size of the marker in the captured image before being displayed. If a plurality of markers are used in the game system 100, then there is marker information 582 for each marker used.

The object information 583 is information relating to the virtual object which is displayed at a position corresponding to the marker. An object ID for identifying a virtual object and object data for three-dimensional image rendering, for example, are included in the object information 583. If there are a plurality of modes of the virtual object, then the data of the respective modes of the virtual object are also included in the object data. The mode of the virtual object means the external appearance of the virtual object, and a change in the mode of the virtual object means change in the external appearance of the virtual object. The external appearance of the virtual object is defined by a set of points, lines, surfaces, and the like, in the local coordinates system in the virtual object, for example. For instance, if the virtual object is a human object, then a change in the mode of the virtual object means a change in the facial expression, clothing, posture, or the like, and data for each expression, clothing, posture, etc., are included in the object data. If a plurality of virtual objects are used in the game system 100, then there is object information 583 for each virtual object.

The condition information 584 is information relating to branching conditions relating to the development of the game. The condition information 584 includes a condition ID for identifying a condition, condition detail, and an action which is executed when the condition detail is satisfied. The game device 1 holds a plurality of condition information 584. The details are described hereinafter.

The game development status information 585 is information which records the development status of a game. The game development status information 585 includes, for example, the player status, the status of each field of a board in use, the coordinate values of each virtual object in each marker coordinates system, and the like. The player status and the status of each field (and in particular, fields having a marker) include, for example, information relating to display, such as the mode of the virtual object which is displayed, and attribute information of the respective fields, virtual objects, and players, etc., such as a number of accumulated points which is used in the game.

Figure 6:
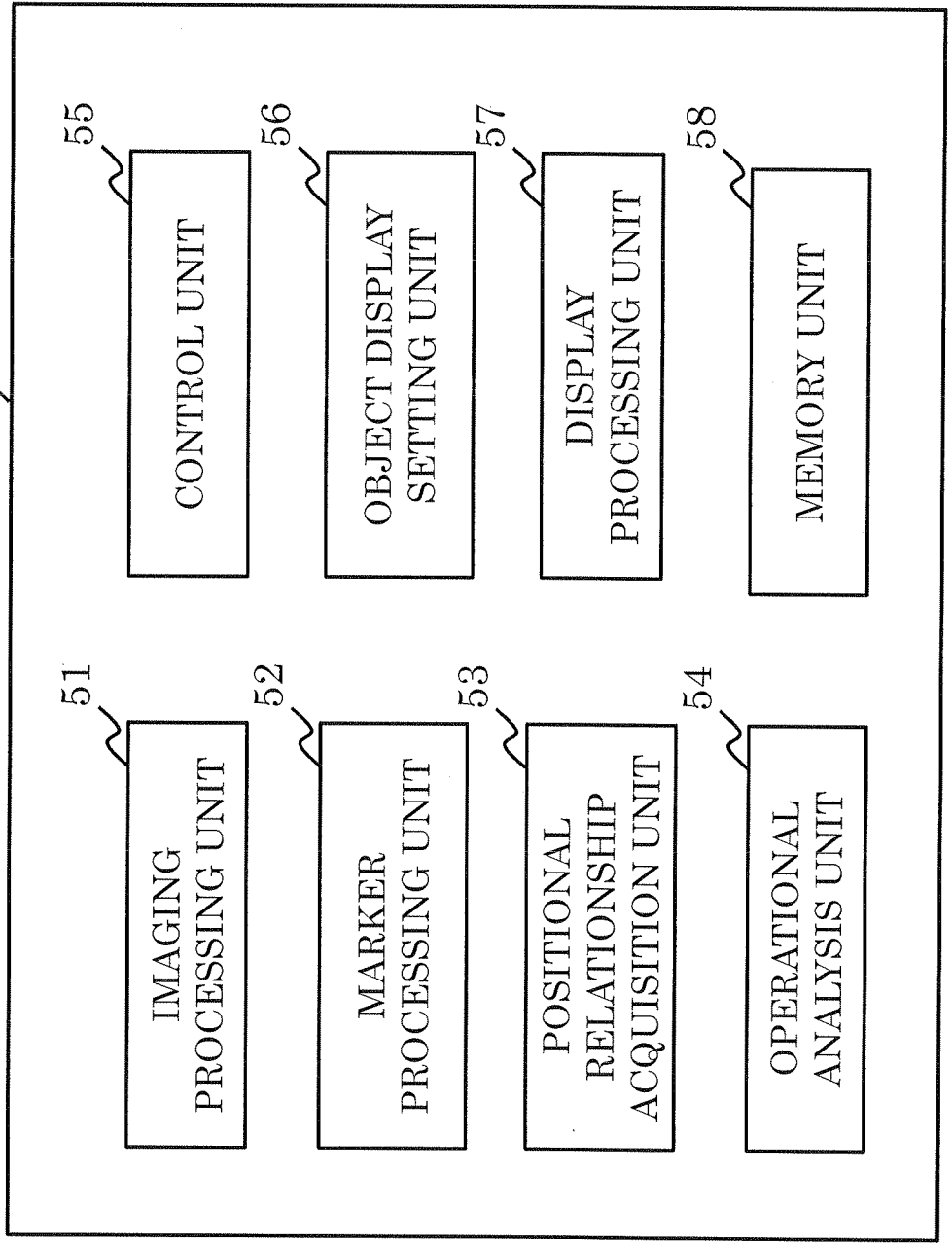
FIG. 6 shows an example non-limiting a functional block diagram of a game device.

FIG. 6 is one example of a functional block diagram of a game device 1. The functional block illustrated in FIG. 6 is one function which is achieved by the information processing unit 31 (CPU 311 and GPU 312) reading out and executing a game program which is stored in the external memory 45, for example.

By the execution of the game program, the information processing unit 31 of the game device 1 functions as an imaging processing unit 51, a marker processing unit 52, a positional relationship acquisition unit 53, an operational analysis unit 54, a control unit 55, an object display setting unit 56 and a display processing unit 57. The memory unit 58 is created in a storage area of the main memory 32, the external data memory 46 or the internal data memory, dynamically or statically, by means of memory allocation by execution of the game program.

The imaging processing unit 51 generates a two-dimensional captured image by image capture by the outside imaging units 23 and the inside imaging unit 24. The imaging processing unit 51 is also able to indicate a predetermined interval for capturing an image, to the outside imaging unit 23 or the inside imaging unit 24. The predetermined interval is ¹⁄₆₀ second, for instance. More specifically, the outside imaging unit 23 and the inside imaging unit 24 capture images at the predetermined interval and the imaging processing unit 51 generates a captured image which is a two-dimensional pixel sequence, at the predetermined interval. The captured image thus generated is output to the marker processing unit 52 and the display processing unit 57.

The marker processing unit 52 executes image recognition processing, such as pattern matching, on the captured image input from the imaging processing unit 51, and detects a marker corresponding to the marker image data included in the marker information 582 of the memory unit 58. An image recognition engine, for example, is used for this marker detection.

The marker processing unit 52 reads out marker information 582 corresponding to the detected marker, from the memory unit 58, and detects the distance of the marker from the outside imaging unit 23, the angle of inclination of the marker, and the orientation of the marker, in other words, the marker coordinate system. Processing of this kind is performed using a dedicated software library, such as ARToolKit, for example. The marker detection results including the marker coordinate system are output to the positional relationship acquisition unit 53 and the object display setting unit 56.

Moreover, the marker processing unit 52 determines the coordinates of the detected marker in a reference coordinate system, from the captured image. Since captured images are input successively at predetermined intervals from the imaging processing unit 51, then the marker processing unit 52 determines the coordinates of the detected marker in the reference coordinate system, in each of the captured images which are input successively. The determined marker coordinates are output to the positional relationship acquisition unit 53. The reference coordinate system may be, for example, a marker coordinate system of any marker included in the captured image, a coordinate system in the captured image plane, a camera coordinate system which is defined by XY axes in a plane parallel to the imaging plane and a Z axis which is orthogonal to this parallel plane, or a coordinate system defined by mutually orthogonal XYZ axes having a point of origin at a predetermined position in the real space. The coordinate system in the real space specifies the position of the point of origin before the start of the game, for example, and the position of the game device 1 and the respective markers in the coordinate system in the real space is acquired from the information obtained by the acceleration sensor 39 and the angular rate sensor 40 provided in the game device 1. The coordinates of the markers may be determined with respect to any characteristic point including the centre point of the marker.

If the captured image includes a plurality of markers, the marker processing unit 52 carries out the processing described above in respect of each of the markers.

The positional relationship acquisition unit 53 acquires the positional relationship between two markers in each combination of two markers, of the two or more markers which are included in a captured image, from the coordinates of the markers in the marker coordinate system and the reference coordinate system, which are input from the marker processing unit 52. The positional relationship between the two markers includes, for example, the distance between the two markers, the orientation of the two markers, the direction in which one of the markers is positioned with respect to the other marker, or the like, or a combination of these. The positional relationship between the two markers is acquired for each of the captured images input from the marker processing unit 52, in other words, at the predetermined intervals when the captured images are generated.

The positional relationship acquisition unit 53 buffers the determined positional relationship between the two markers for a predetermined period of time and monitors the change in the positional relationship. In the first embodiment, the markers on the board 2 are fixed to the board 2, and change in the positional relationship of the two markers indicates that there has been movement of a player card 3. When change in the positional relationship between the two markers is detected, the positional relationship acquisition unit 53 outputs the details of the change and the positional relationship between the two markers after the change, to the control unit 55. The change in the positional relationship includes, for example, change in the distance between the two markers, change in the direction in which the one marker is positioned with respect to the other markers, change in the orientation of one marker with respect to the other marker, or the like, and a combination of these. Change in the positional relationship between the two markers may include, for example, the appearance of a new positional relationship between two markers, due to the arrangement of an additional player card on the board 2, or the elimination of a positional relationship between two markers due to the removal of a player card 3 from the board 2.

When the touch panel 13, the operating buttons 14A to 14E and the analog stick 15 are operated by the user, the operation analysis unit 54 analyzes the operational content from the press signals of the touch panel 13, operating buttons 14A to 14E, and an analog stick 15. The analysis results of the operational content are output to the control unit 55.

The control unit 55 manages the development of the game. More specifically, the control unit 55 executes the following processing. (1) The control unit 55 judges whether or not at least one of the change content in the positional relationship between the marker of the player card 3 and the marker of the square on the board 2, and the positional relationship after change, which are input from the positional relationship acquisition unit 53, matches any of the condition information 584 of the memory unit 58. If any of the condition information 584 is matched, then the control unit 55 executes the action included in the condition information 584.

(2) The control unit 55 executes processing corresponding to the operational content of the touch panel 13 or the operating buttons 14A to 14E input from the operation analysis unit 54. The processing executed in accordance with the operational content from the operation analysis unit 54 is processing relating to the game which develops in a virtual space, for instance, choosing a used item, displaying the status of a player, and the like, in accordance with the operational content performed by the user, for instance.

(3) The control unit 55 records the game development status in the game development status information 585 of the memory unit 58. The control unit 55 updates the game development status information 585, when there has been a change in the virtual space on the board 2. Change in the virtual space on the board 2 is, for example, change relating to display, such as change in the virtual objects on the markers on the board 2, or in the mode of the virtual object on the player card 3, or internal change (change having an effect in the virtual space), such as change in a player experience value, held items, or other attribute information.

(4) If the captured image includes only a portion of the board 2, the control unit 55 deduces where this portion is situated in the board the captured image is from, on the basis of the arrangement between a portion of markers on the board 2 which is included in the captured image. Furthermore, if the captured image includes only a portion of a marker, complementary processing for displaying the corresponding object is carried out by complementing the missing portion of the marker which is only partially included, from the positional relationship with other markers included in the captured image. The control unit 55 infers which portion of the board 2 is included in the captured image, on the basis of the marker arrangement information included in the board information 581 of the memory unit 58.

(5) The control unit 55 acquires information about the board 2 and recognizes the board 2, before the start of the game. The details of the board recognition processing are described in FIG. 8.

If it is needed to change the display mode of a virtual object in the virtual space due to the processing by the control unit 55 in (1), (2) and (4) above, the control unit 55 outputs an instruction to change the display, to the object display setting unit 56.

When a marker detection result is input from the marker processing unit 52, the object display setting unit 56 refers to the marker information 582 for that marker, and the game development status information 585, and carries out display settings for the virtual object which is displayed in accordance with the marker. The display settings of the virtual object are, for example, the display position of the virtual object with respect to the marker, the display size of the virtual object, and the figure (expression, etc.) of the virtual object. Furthermore, upon receiving a virtual object display change instruction from the control unit 55, the object display setting unit 56 changes the virtual object display settings in accordance with the change instruction. The object display setting unit 56 outputs the virtual object display settings to the display processing unit 57.

The display processing unit 57 superimposes the virtual object on the captured image, in accordance with the virtual object display settings made by the object display setting unit 56, and executes a rendering process. The image (superimposed image) generated by the rendering process is output and displayed on the upper LCD 22. If the captured image includes a plurality of markers, then the display processing unit 57 executes a rendering process for the corresponding virtual objects, in respect of each of the markers. The rendering process performed by the display processing unit 57 is executed by the GPU 312, for example.

(Initial Setting Process)

Figure 7:
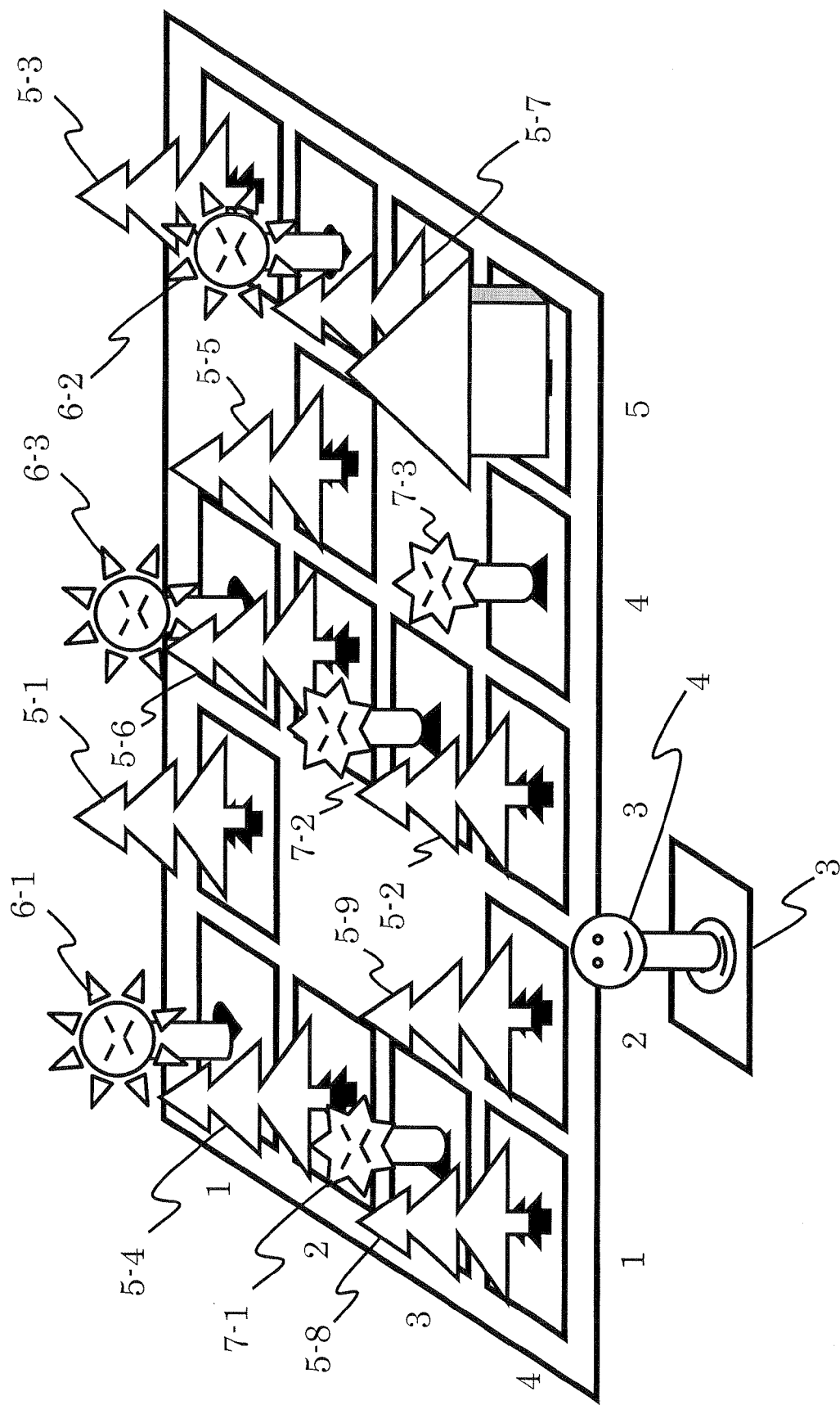
FIG. 7 shows an example non-limiting initial state of a board and a player card in a virtual space.

FIG. 7 is a diagram illustrating an initial status of a board 2 and a player card 3 in the virtual space. Before the game starts, firstly, an initial setting process which is a process recognizing the board 2 and performing initial setup of the virtual space is carried out. When an image of the whole of the board 2 is captured by the game device 1 after the initial setting process has been executed, tree objects 5-1 to 5-9, first enemy character objects 6-1, 6-2, 6-3, second enemy character objects 7-1 to 7-3, a house object 8, and the like, respectively appear (are displayed) at positions corresponding to the related markers. Furthermore, a player object appears (is displayed) on the player card 3 in the virtual space.

The board 2 illustrated in FIG. 7 has five fields in the horizontal direction (five rows) and four fields in the vertical direction (four columns). The fields on the board 2 are labeled with an identification number, field ij, consisting of a row number i and a column number j. The square arrangement information of the board information 581 of the board 2 illustrated in FIG. 7 includes fields 11, 12, 13, 15, 21, 23, 24, 25, 31, 33, 35, 41, 42, 43, 44, 45. Furthermore, the square arrangement information includes enemy object 6-1 in field 11, . . . (abbreviated). Below, a square ij is denoted using the identification number of the respective field of this kind.

Figure 8:
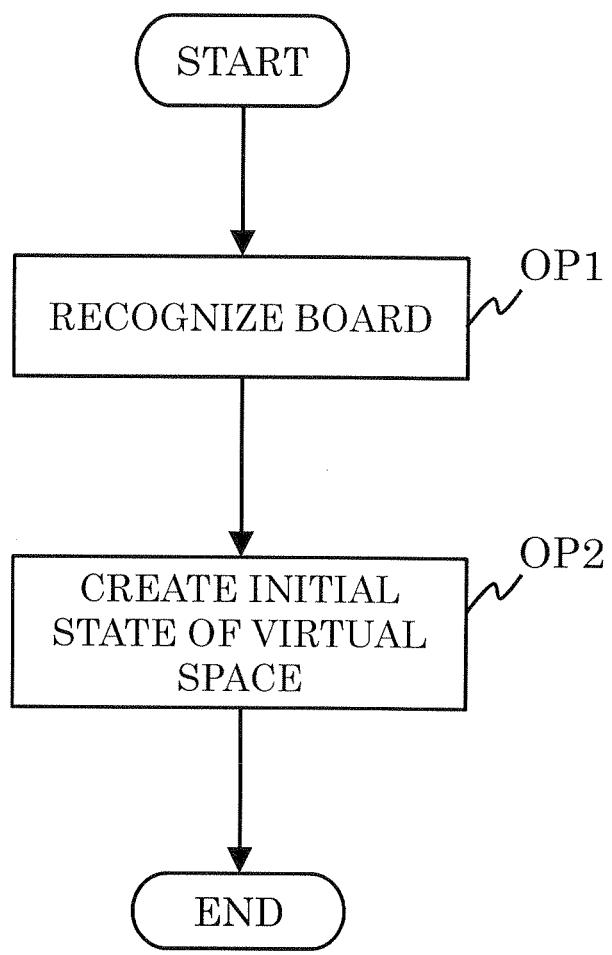
FIG. 8 shows an example non-limiting flowchart of an initial setup process.

FIG. 8 is an example of a flowchart of an initial setting process. The initial setting process illustrated in FIG. 8 is started, for example, when start of the initial setting process is selected due to the user operating the game device 1.

At OP1, the game device 1 executes a board recognition process for recognizing the board. In the first embodiment, the object of recognizing the board is in order to generate board information 581. Alternatively, the object of recognizing the board is in order to identify one of a plurality of board information 581. Therefore, the following processes are given as examples of the board recognition process.

(1) The game device 1 holds a plurality of board information 581 in advance, in the memory unit 58. The game device 1 captures an image of the whole of the board 2 by the outside imaging unit 23, and acquires the arrangement of all of the markers included on the board 2, from the captured image, by image recognition processing by the marker processing unit 52. The control unit 55 compares the acquired arrangement of all of the markers on the board 2 with the marker arrangement information included in the respective board information 581 held in the memory unit 58. The control unit 55 may identify the board information 581 including the marker arrangement information which has greatest similarity as a result of the comparison, as the board information 581 corresponding to the board 2. Alternatively, image data for the whole board may be included in each board information 581, and the board information 581 may be identified by comparing the captured image including the whole board 2 with the image data of respective boards.

(2) In the processing in (1) above, an identification image which is unique to each board is used instead of an image of the whole board. In this case, an identification image is printed on the board 2 and moreover, identification image data is included in the board information 581 and held on the memory unit 58. The game device 1 detects the identification image from the captured image including the board 2 and identifies board information 581 corresponding to the detected identification image. The identification image may be an image of a board ID.

(3) A two-dimensional code such as a QR code, for example, is applied to the board 2, and the control unit 55 of the game device 1 detects and analyzes the two-dimensional code from the captured image captured by the outside imaging unit 23, and generates board information 581 of the board 2 from the acquired information. The two-dimensional code printed on the board 2 includes, for example, square arrangement information and marker arrangement information. Furthermore, for example, the two-dimensional code may also include additional information relating to the game, such as a stage name limit time, and the like. In this case, the game device 1 needs to include software for recognizing a two-dimensional code, but it is also possible to add a new board subsequently, or to expand an existing board, separately from the purchase or distribution of the game system 100.

(4) The game device 1 acquires a plurality of partial images of a board 2 along the four edges, by means of the outside imaging unit 23. The game device 1 detects a marker from the partial images of the plurality of boards 2 and acquires an arrangement of the markers, and the like, by image recognition processing by the marker processing unit 52. By this means, the game device 1 generates board information 581 for the board 2. In this case, in order to capture partial images of the board 2, the user needs to move the game device 1 along the four edges of the board 2. Furthermore, the game device 1 may extract a plurality of partial images from the whole image of the board 2.

(5) When the game starts, the game device 1 recognizes a square and marker of a game start point for the player on the board 2. The game device 1 does not recognize the whole of the board 2. In this case, if the game starts with the board information 581 still incomplete, the game device 1 progressively adds relevant information to the board information 581 when a new square and marker are recognized.

It is also possible for the game device 1 to select which of the aforementioned processes (1) to (5) to carry out as the board recognition process in OP1, in accordance with the game executed by the game system 100. Furthermore, it is also possible to execute the board recognition process by fixing the processing to any one of the processes (1) to (5) above, in accordance with the game provided by the game system 100.

At OP2, the control unit 55 creates an initial status in the virtual space on the basis of the identified or generated board information 581. For example, if the process in (1) to (4) is carried out at OP1, then virtual object display settings are made by the object display setting unit 56 in relation to all of the markers included in the board 2. If the process in (5) is carried out at OP1, then virtual object display settings are made by the object display setting unit 56 in relation to the recognized marker only. When the creation of the initial state of the virtual space has been completed, the processing illustrated in FIG. 8 is terminated.

When the processing illustrated in FIG. 8 has terminated, the game system 100 assumes a state in which a game is started.

(First Game Development Processing)

The first game development processing is processing relating to game development which is executed on the basis of the marker on the player card and the positional relationship between markers on the board 2. The game device 1 executes the first game development processing in accordance with the setting details of the condition information 584 which are held in the memory unit 58.

Figure 9:
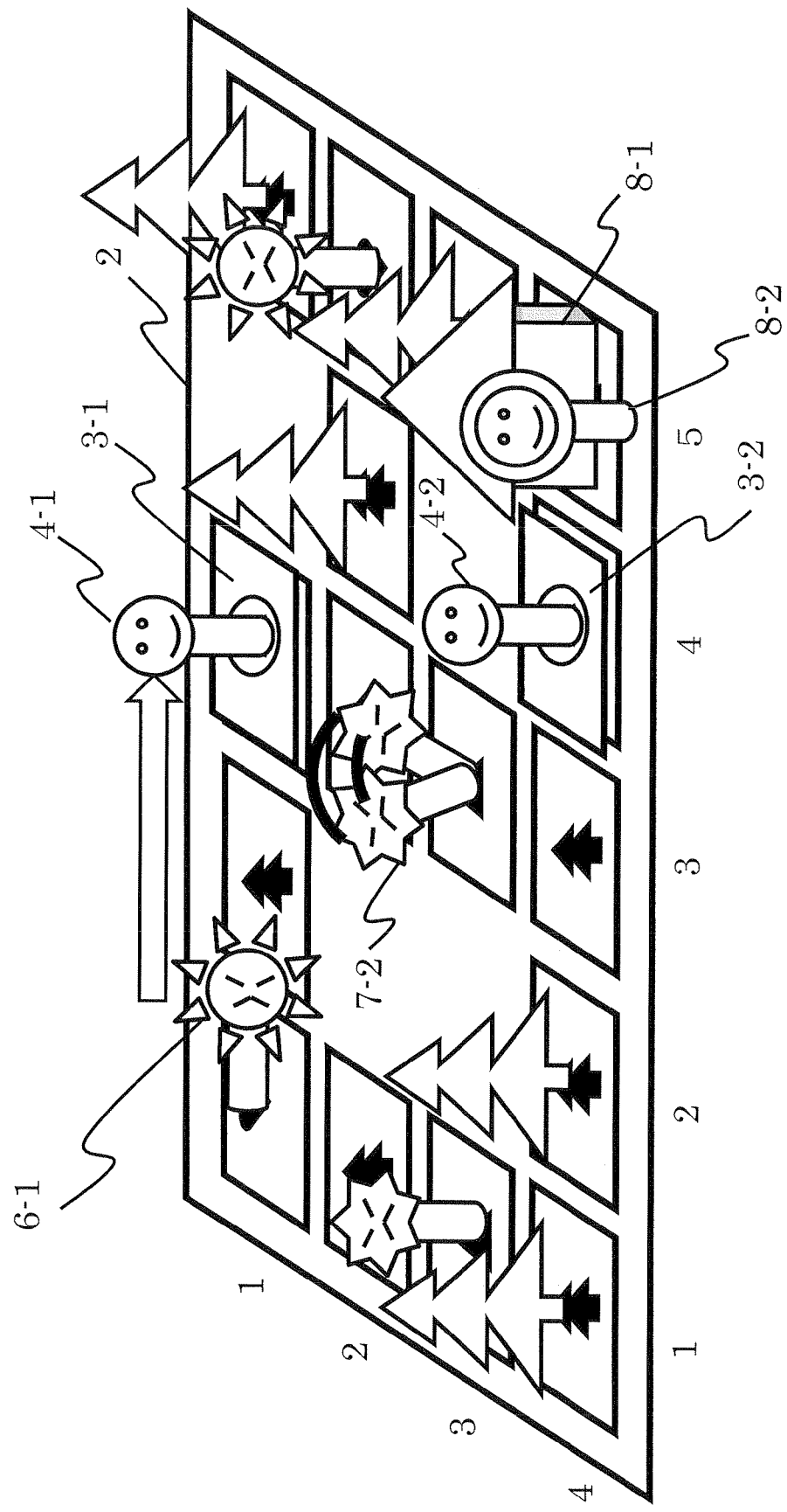
FIG. 9 shows an example non-limiting state on the board 2 when the first game development processing is carried out.

FIG. 9 is a diagram illustrating a state on the board 2 when the first game development processing is carried out. In FIG. 9, a board which is the same as the board 2 illustrated in FIG. 7 is depicted.

FIG. 10 is an example of condition information 584 which defines the development conditions of the first game development processing. The condition information 584 defines a "condition" and an "action" relating to the "condition". The condition information 584 is held in the memory unit 58 in corresponding number to the number of conditions, and the respective elements of the condition information 584 are identified by the condition ID (see FIG. 5).

The "condition" in the condition information 584 of the first game development processing is set on the basis of the positional relationship between the marker on the player card 3 and the marker on the board 2. Furthermore, processing for superimposing information on the real space is set as the "action" in the condition information 584 of the first game development processing. The processing for superimposing information on the real space is processing for causing effects in the virtual space, such as displaying a player object 4 in a predetermined mode in a superimposed fashion on a position corresponding to the marker of the player card 3 in the real space, displaying a virtual object in a predetermined figure in a superimposed fashion on a position corresponding to the marker on the board 2 in the real space, changing the player attributes (acquired points, items, etc.) in the virtual space, causing the time in the game (virtual space) to elapse, and the like.

Information which is detected from the positions of the markers is used as the positional relationship between the marker of the player card 3 and the marker on the board 2, in the "condition" of the condition information 584 of the first game development processing. The position of the marker is the coordinates of the reference point of the marker in the reference coordinates system which is acquired by the marker processing unit 52, for example. Alternatively, the marker position may be a square on the board 2. If the position of the marker is judged to be a square on the board 2, then the control unit 55 judges the square where the marker is positioned, on the basis of the detection results of the respective markers from the marker processing unit 52 and the board information 581. The reference point of a marker is a characteristic point or a central portion of the marker, for instance. Alternatively, the marker position may be a square, for instance. If the marker position is a square, then since the squares where the markers are arranged on the board 2 are set in advance and the square where the marker of a player card 3 is positioned is identified, then the positional relationship is judged easily.

The information which is detected from the positions of the respective markers is, for example, (a) the distance between the marker of the player card 3 and the marker on the board 2, (b) the orientation of the marker of the player card 3 and the marker on the board 2, (c) the direction in which one of the marker of the player card 3 and the marker on the board 2 is positioned, taking the position of the other marker as a reference, and a combination of (a) to (c), or the like.

(a) The distance between the marker of the player card 3 and the marker on the board 2 may be the distance between the coordinates of the respective markers in the reference coordinates system, as acquired by the positional relationship acquisition unit 53. Alternatively, this may also be a number of squares present between the square where the marker of the player card 3 is arranged and the square where a marker on the board 2 is arranged.

(b) The orientation of the marker of the player card 3 and the marker on the board 2 may be, for example, the orientation of the player card 3 with respect to the marker on the board 2 or the relationship between the orientations of the respect markers. The relationship between the orientations of the respective markers is, for instance, orientation in the same direction, orientation in opposite directions, mutually facing, and so on. These marker orientations are acquired by the positional relationship acquisition unit 53 on the basis of the respective marker coordinates systems acquired by the marker processing unit 52.

(c) The direction of one of the marker of the player card 3 and a marker on the board 2 with respect to the position of the other marker indicates, for instance, whether the marker of the player card 3 is positioned to the front, rear, left or right (or north, south, east or west) of the marker on the board 2. The direction in which one marker is positioned with respect to the position of the other marker is acquired by the positional relationship acquisition unit 53 on the basis of the respective marker coordinates systems acquired by the marker processing unit 52.

Furthermore, the "condition" in the condition information 584 of the first game development processing is also defined by the change in the positional relationship due to change in the arrangement of the player card 3. The change in the positional relationship is the changes in (a) to (c) above and a combination of the changes in (a) to (c).

(a) Change in the distance between the marker of the player card 3 and the marker on the board 2 includes, for example, increase or decrease in this distance. (b) Change in the orientation of the marker of the player card 3 and the marker on the board 2 include change in the orientation of the maker of the player card 3 due to change in the arrangement of the player card 3, for example. (c) Change in the direction in which one marker is positioned with reference to the position of the other marker includes, for example, change in the direction in which the marker of the player card 3 is positioned with reference to a second marker on the board 2, due to change in the arrangement of the player card 3.

The condition information 581 of the first game development processing illustrated in FIG. 10 is a concrete example of a "condition" and an "action" corresponding to the "condition", which are set on the basis of the positional relationship in (a) to (c) described above and a combination of (a) to (c), and change in the positional relationship. The condition information 581 of the first game development processing may be set on the basis of a combination of the positional relationship and the change in the positional relationship.

In the condition information having condition ID "1", the fact that the marker of the player card 3 is overlapping with the marker of an enemy character object is set as the "condition" and the start of a fight with the enemy character object is set as the "action". The control unit 55 judges that the marker of the player card 3 is overlapping with the marker of an enemy character object, for instance, by the fact that the change content in the positional relationship between the two markers is a shortening of the distance, and that the positional relationship after change is in a predetermined range which is such that the coordinate values of the two markers are regarded as being positioned on the same square. FIG. 9 illustrates an example of game development in a case which matches the "condition" of the condition information having condition ID "1" in FIG. 10. FIG. 9 depicts a situation where the marker of player card 3-1 is overlapping with the marker of square 13, due to the player card 3-1 being moved from square 11 to square 13 (FIG. 7) where the marker of an enemy character 6-3 is situated. Thereupon, on the board 2, processing for a fight with the enemy character object corresponding to the marker of square 13 is executed.

In the condition information having condition ID "2", the fact that the marker of the player card 3 has separated from the marker of a fallen enemy character object is set as the "condition" and the fact that the virtual object of the enemy character object is displayed in a fallen state is set as the "action". The control unit 55 judges that the marker of the player card 3 has separated from the marker of the defeated enemy character object due to the fact that the change content in the positional relationship between the two markers is an increase in the distance, for example. FIG. 9 illustrates an example of game development in a case which matches the "condition" of the condition information having condition ID "2" in FIG. 10. FIG. 9 illustrates a situation where the player has defeated an enemy character object on square 11 and has then moved the player card 3-1 from square 11 to square 13. Consequently, on the board 2 in FIG. 9, the enemy character object 6-1 on square 11 is displayed in a fallen state.

In the condition information having condition ID "3", the fact that the marker of the player card 3 is positioned at a square adjacent to the marker of a house object is set as the "condition" and the fact that the character comes out from the house object is set as the "action". The control unit 55 judges that the marker of the player card 3 is positioned on a square adjacent to the house object marker from the fact that the change content in the positional relationship between the two markers is a shortening of the distance, and the positional relationship after change is such that the marker of the player card 3 is positioned on an adjacent square to the marker of the house object. However, it is also possible to judge that the marker of the player card 3 is positioned on an adjacent square by calculating the distance between the marker of the player card 3 and the marker of the house object, and judging whether or not the calculated distance is equal to or less than the dimension of one square. FIG. 9 illustrates an example of game development in a case which matches the "condition" of the condition information having condition ID "3" in FIG. 10. FIG. 9 depicts a situation where a character object 8-2 has come out from a house object 8-1, due to the player card 3-2 having moved to square 44 which is an adjacent square to square 45 of the house object 8-1.

In the condition information having condition ID "4", the fact that the marker of the player card 3 is overlapping with the marker of the house object is set as the "condition" and restoration of the player's strength is set as the "action". If the condition is satisfied, the control unit 55 updates the state of the player in the game development status information 585 by increasing the strength points.

In the condition information having condition ID "5", the fact that the marker of the player card 3 has entered into a range within two squares from the marker of the enemy character object is set as the "condition", and the fact that the enemy character object moves out is set as the "action". The control unit 55 judges that the marker of the player card 3 has entered into a range within two squares from the marker of the enemy character object, for instance, on the basis of the fact that the change content of the positional relationship between the two markers is a shortening of the distance from more than two squares to two squares or less, and the fact that the positional relationship after change is such that the two markers are not overlapping.

In the condition information having condition ID "6", the fact that the marker of the player card 3 has come out from a range within 2 squares from the marker of the enemy character object is set as the "condition", and the fact that the enemy character object ceases to move is set as the "action". The control unit 55 judges that the marker of the player card 3 has come out from a range within two squares from the marker of the enemy character object, for instance, on the basis of the fact that the change content in the positional relationship between the two markers is an increase of the distance from less than two squares to two squares or more.

FIG. 9 illustrates an example of game development in a case which matches the "condition" of the condition information having condition ID "5". FIG. 9 depicts a situation where the player card 3-1 has entered within a range of two squares from the enemy character object 7-2 due to moving to square 13, and the enemy character object 7-2 has moved out. Moreover, in FIG. 9, thereafter, the player card 3-1 moves out from a range of two squares of the enemy character object 7-2, due to moving from square 13 to square 12, for example, and hence the "condition" of the condition information having condition ID "6" is matched and the movement of the enemy character object 7-2 is halted.

In the condition information having condition ID "7", the fact that the marker of the player card 3 has moved from a marker of a square where a seed has been sown is set as the "condition" and the fact that an object corresponding to a sown seed marker grows sequentially from sprout to flower to fruit, as time passes, each time the marker of the player card 3 moves one square further away, is set as the "action". In FIG. 10, the progression from sprout to flower to fruit is set as the "action" corresponding to the "condition" of the condition information having condition ID "7". Instead of this definition of the "action", it is also possible to set a progressive sequence such as sprout→flower→fruit as the "actions" of a plurality of condition information elements.

Furthermore, in the condition information having condition ID "8", the fact that there are a plurality of markers about the periphery of the marker of the player card 3 is set as the "condition" and the fact that the marker nearest to the marker of the player card 3 is selected for processing is set as the "action". The control unit 55 selects the marker nearest to the player card 3, of the plurality of markers present about the periphery of the player card 3, and set this marker for processing. The control unit 55 judges whether or not there is matching condition information 584, on the basis of the positional relationship between the marker selected for processing and the marker of the player card 3 and/or the change in the positional relationship, and if there is matched condition information 584, executes the corresponding action. The markers present about the periphery of the marker of the player card 3 may include a marker of another player card. In this case, the positional relationship acquisition unit 53 of the game device 1 simply needs to acquire the positional relationship between the marker of the player card 3 and the marker on the board 2 which is nearest to the player card 3, and therefore the processing load is reduced.

Of the condition information 584 illustrated in FIG. 10, the "actions" having condition IDs "1" to "3" and "5" to "7" are concrete examples of processing which changes the figure or state of a virtual object. The display state of the virtual space displayed on the game device 1 changes due to the processing for changing the figure or state of the virtual objects. If the display state of the virtual space displayed on the game device 1 changes, then the game device 1 renders the display image again by superimposing the virtual objects at the positions of the respective markers in the real space which is included in the captured image. Consequently, the processing for changing the figure or state of the virtual objects is one process for superimposing information on the real space.

Of the condition information 584 illustrated in FIG. 10, the condition IDs "4" and "8" are examples of internal processing which does not accompany change in the display state of the virtual space which is displayed on the game device 1. However, the game device 1 also holds information which has been changed by internal processing, as information about the board 2 in the real space and the virtual object corresponding to the player card 3. Therefore, the internal processing which does not accompany change in the display status of the virtual space which is displayed on the game device 1 is regarded as one process for superimposing information on the real space.

FIG. 10 only depicts a portion of an example of condition information 584 and does not depict a case where all of the condition information illustrated in FIG. 10 is employed in one game. Furthermore, the condition information 584 of the game system 100 is not limited to the example in FIG. 10. Moreover, in the first embodiment, a game system 100 is described, but it is also possible to raise the usability of a real space which is augmented by superimposing information in a system other than a game system, by setting "actions" in relation to "conditions", in accordance with the purpose of the system.

Figure 11:
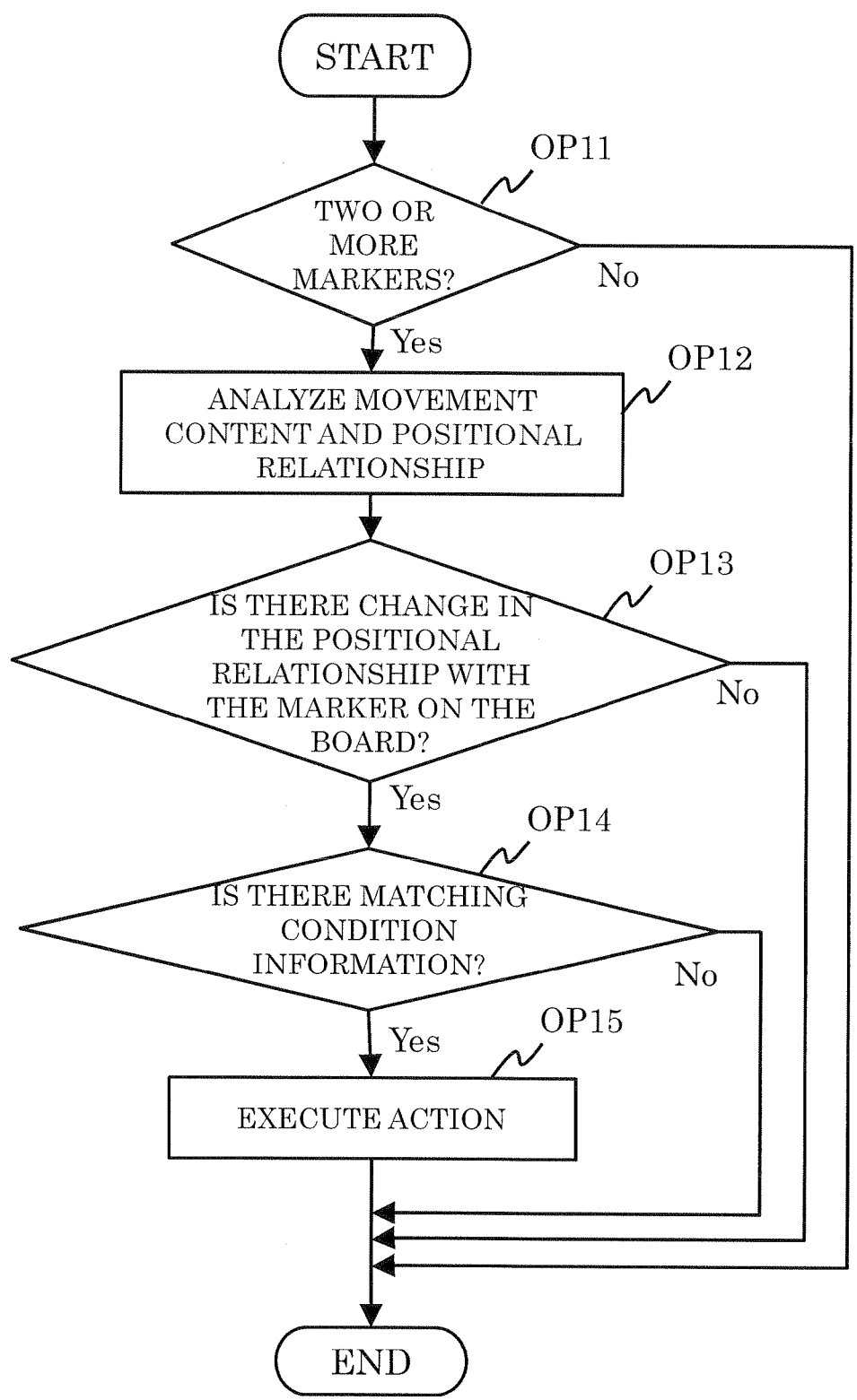
FIG. 11 shows an example non-limiting flowchart of first game development processing.

FIG. 11 is an example of a flowchart of first game development processing. The processing illustrated in FIG. 11 is started together with the start of a game. Furthermore, the processing depicted in FIG. 11 is executed repeatedly at predetermined cycles, until the game ends. Moreover, the processing depicted in FIG. 11 is executed for each combination of two markers including a marker of the player card 3 and the markers on the board 2, in the captured image.

At OP11, the positional relationship acquisition unit 53 judges whether or not the captured image includes two or more markers. The positional relationship acquisition unit 53 performs this judgment on the basis of the marker detection result input from the marker detection unit 52. If the captured image includes two or more markers (OP11: Yes), then the processing advances to OP12. If the captured image does not include two or more markers (OP11: No), then the processing illustrated in FIG. 11 is terminated.

At OP12, the positional relationship acquisition unit 53 monitors change in the positional relationship between two markers, from among the detected markers. At OP13, the positional relationship acquisition unit 53 judges whether or not change in the positional relationship between the two markers has been detected. If change in the positional relationship between the two markers has been detected (OP13: Yes), then the positional relationship acquisition unit 53 outputs the content of the change in the positional relationship between the two markers, and the positional relationship after change, to the control unit 55, and processing then advances to OP14. If change in the positional relationship between the two markers is not detected (OP13: No), then the processing illustrated in FIG. 11 is terminated.

At OP14, the control unit 55 judges whether or not there is condition information 584 of which the "condition" is satisfied, among the condition information 584 in the memory unit 58, on the basis of the change content of the positional relationship between the two markers input from the positional relationship acquisition unit 53, and the positional relationship after change. If there is condition information 584 of which the "condition" is satisfied (OP14: Yes), then the processing advances to OP15. If there is no condition information 584 of which the "condition" is satisfied, then the processing illustrated in FIG. 11 is terminated.

At OP15, the control unit 55 executes the "action" set in the condition information 584 of which the "condition" is satisfied. Thereafter, the processing illustrated in FIG. 11 terminates.

(Second Game Development Processing)

The second game development processing is processing relating to game development which is executed in respect of the other marker on the board 2 when one of the marker of the player card 3 and a marker on the board 2 have satisfied a predetermined condition. The second game development processing is also defined by the condition information 584 which is held in the memory unit 58, similarly to the first game development processing.

Figure 12A:
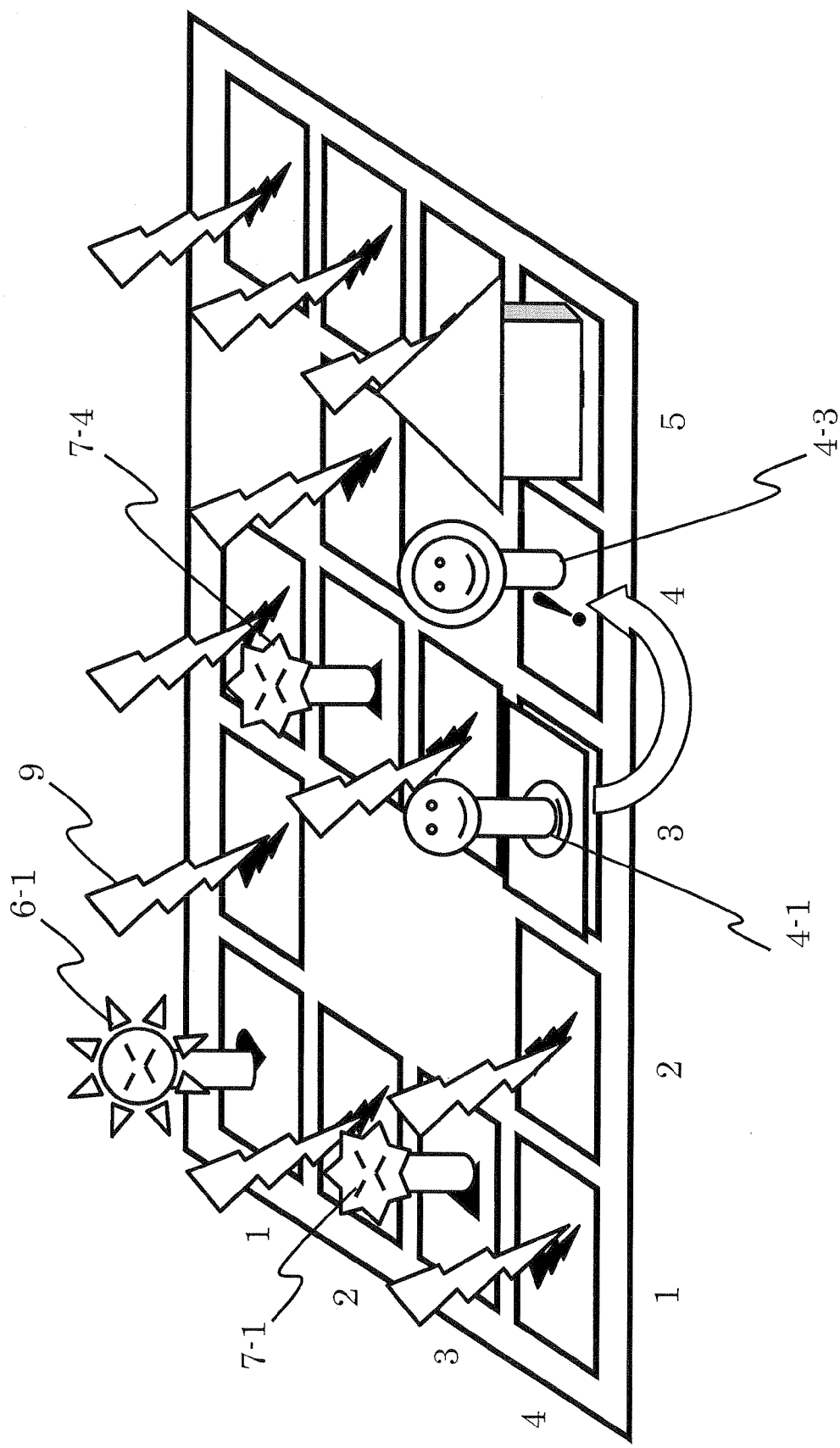
FIG. 12A shows a diagram for describing one example of second game development processing.
Figure 12B:
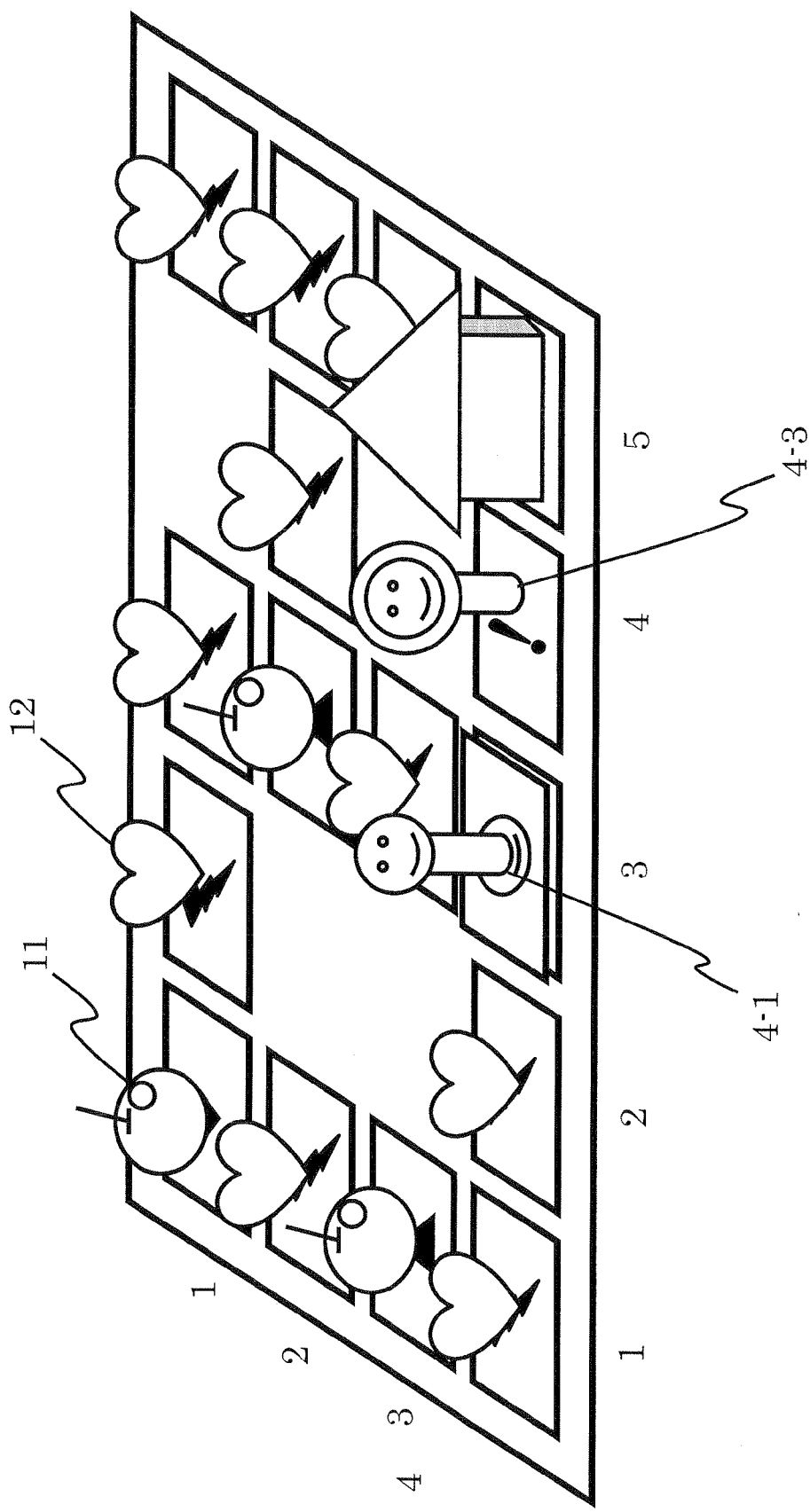
FIG. 12B shows a diagram for describing one example of second game development processing.

FIG. 12A and FIG. 12B are diagrams for describing one example of the second game development processing. FIG. 12A and FIG. 12B depict a virtual space of the same board which has five fields horizontally and four fields vertically.

In FIG. 12A, the player object 4-1 is disposed on the square 43 and an assistant character object 4-3 is disposed on the square 44. The assistant character is a character which supports the player, for instance, by giving the player hints or giving the player items. Furthermore, in FIG. 12A, there are also enemy character objects or lightning objects 9, on squares apart from square 43 to 45. The lightning objects 9 are objects which have a damaging effect on the player. For example, if the player object 4-1 enters into a square of a lightning object 9, then an action such as deducting one point from the points held by the player is executed.

In the virtual space depicted in FIG. 12A, for instance, when the player object 4-1 makes contact by talking to the assistant character object 4-3, then the virtual space is changed to a state such as that depicted in FIG. 12B. The talking action is one action which is executed by a command that instructs the player to perform an operation in the virtual space, which is selected by controlling the operating buttons 14 or the touch panel 13 of the game device 1.

In FIG. 12B, apple objects 11 are displayed on the markers where the enemy character objects 6-1, 7-1, 7-4 are displayed in FIG. 12A, and heart objects 12 are displayed on the markers where the lightning objects 9 are displayed in FIG. 12A. The apple objects 11 and the heart objects 12 are strength restoring items.

FIG. 12A and FIG. 12B depict examples where the objects which have a damaging effect on the player are changed to objects which have a beneficial effect on the player. If a condition for executing an action whereby the player object 4-1 talks to the assistant character is satisfied, then the enemy character objects 6-1, 7-1, 7-4 and the lightning objects 9, and the like, change to apple objects 11 and heart objects 12, or the like.

As described above, in the second game development processing, when a predetermined condition is satisfied, then predetermined processing is executed in respect of virtual objects other than the two virtual objects which satisfy the condition.

FIG. 13 is an example of condition information 584 which defines the second game development processing. The "condition" of the condition information 584 of the second game development processing is set to the positional relationship between the marker of the player card 3 and a marker on the board 2, the content of the action indicated in relation to the player by the game device 1, or a combination of these. The "action" of the condition information 584 of the second game development processing is set to processing which acts on the virtual space, and in particular, on virtual objects other than the two virtual objects which satisfy the "condition" of the condition information 584. The processing which acts on the virtual space is, for example, processing for changing the form or state of virtual objects other than two virtual objects which satisfy the "condition" of the condition information 584, which is accompanied by change in the display on the screen of the game device 1. Furthermore, the processing which acts on the virtual space is not limited to this and also includes processing that is not accompanied by change in display on the screen of the game device 1. The processing which is not accompanied by change in the display on the screen of the game device 1 is, for instance, processing for changing attribute information such as the points of the virtual objects other than the two virtual objects satisfying the "condition" of the condition information 584, and this is processing which changes the effects applied to the virtual objects. More specifically, in the "action" in the condition information 584, processing for superimposing information on the captured image is executed.

The "actions" of the respective condition information 584 of the second game development processing depicted in FIG. 13 are concrete examples of processing for superimposing information of a real space.

The condition information having condition ID "11" is condition information which defines processing that is described in FIG. 12A and FIG. 12B, and therefore this information is not explained further here.

In the condition information having condition ID "12", the fact that a player executes an action of cutting down a tree object is set as the "condition", and the fact that a tree object inside a predetermined range of the tree object that is cut down also falls down is set as the "action". Cutting down a tree object is one action which is instructed by a command selected by the player from the game device 1, for instance, the operating buttons 14 of the game device 1, the touch panel 13 or the analog stick 15. In the game device 1, the execution of an action of cutting down a tree object is judged by the control unit 55 on the basis of an operating signal from the operation analysis unit 54.

In the condition information having condition ID "13", the fact that a player has fought an enemy character object and won is set as the "condition", and the fact that an enemy character object of the same type as this enemy character object also falls is set as the "action". For example, a fight between the player and the enemy character is processed by the execution of a special program, and the control unit 55 judges that the player has won on the basis of the execution results of the program.

In the condition information having condition ID "14", the fact that the player object 4 is facing the enemy character object is set as the "condition" and the fact that an enemy character object other than the enemy character object facing the player object pays attention to the player object 4 (faces towards the player object 4) is set as the "action". The fact that the player object 4 is facing the enemy character object is judged by the control unit 55 from the fact that the marker of the player card 3 is positioned on an adjacent square to the front of the enemy character object 4 and the orientation of the marker of the player card 3 is in the direction of the enemy object 4.

Furthermore, apart from the condition information illustrated in FIG. 13, there may also be condition information such as that indicated below. For example, in FIG. 12A, the fact that the player character 4-1 defeats an enemy character 7-4 may be set as the "condition" and the fact that the assistant character 4-3 assumes a state of being able to restore the strength of the player character 4-1 may be set as the "action". In this case, subsequently, if the player card 3 is moved from square 23 to square 44 and overlaps with the square of the assistant character 4-3, then the strength of the player character 4-1 is restored.

Figure 14:
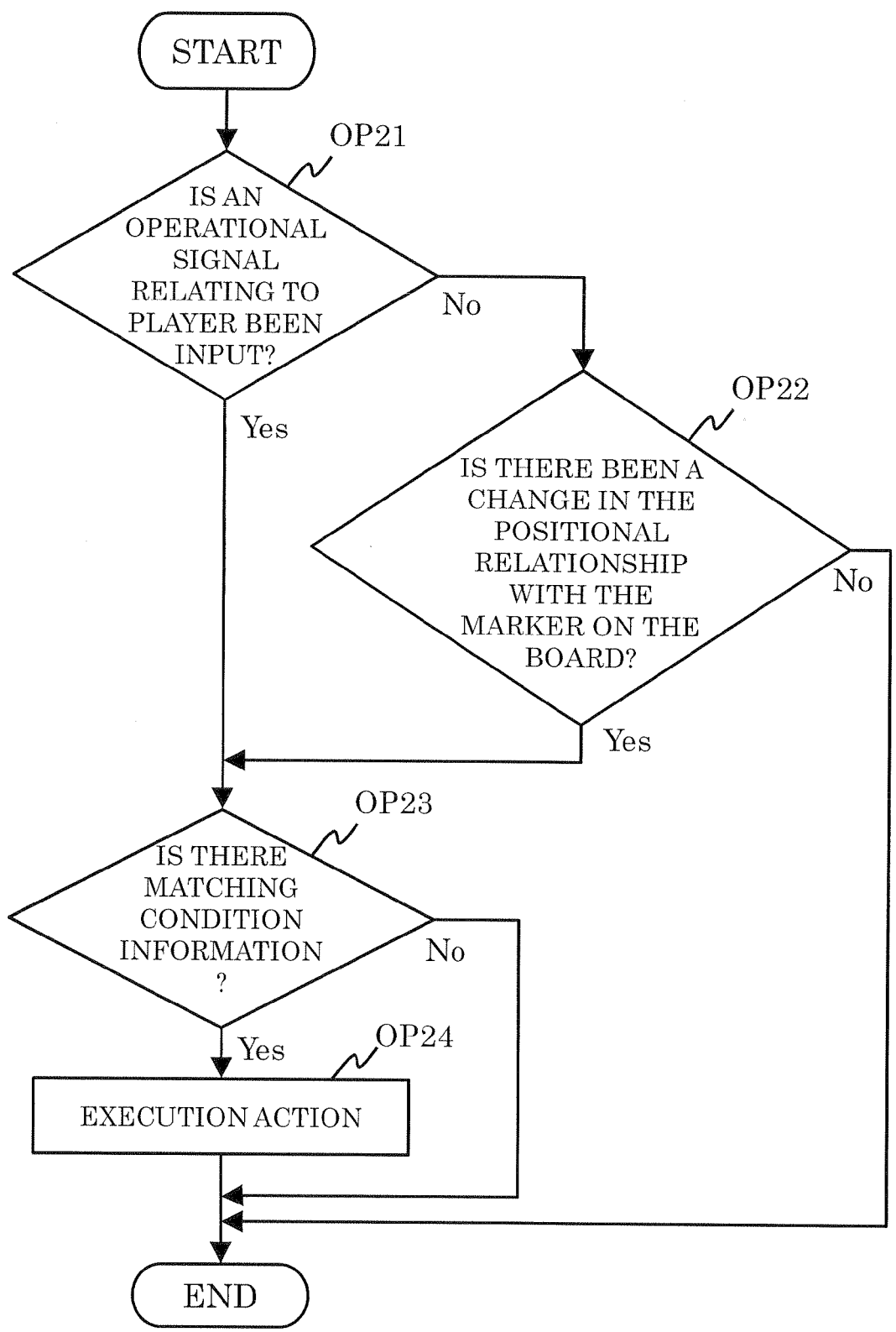
FIG. 14 shows an example non-limiting flowchart of second game development processing.

FIG. 14 is an example of a flowchart of second game development processing. The processing illustrated in FIG. 14 is started together with the start of a game. Furthermore, the processing depicted in FIG. 14 is executed repeatedly at predetermined cycles, until the game ends.

At OP21, the control unit 55 judges whether or not there is an operation relating to the player. The control unit 55 performs this judgment on the basis of an input from the operation analysis unit 54. If there is an operation relating to the player (OP21: Yes), then the processing advances to OP23. If there is no operation relating to the player (OP21: No), then the processing advances to OP22.

At OP22, the control unit 55 judges whether or not change in the positional relationship between the two markers included in the captured image has been detected. The control unit 55 performs this judgment on the basis of an input from the positional relationship acquisition unit 53. If change in the positional relationship between the two markers is detected (OP22: Yes), then the processing advances to OP23. If change in the positional relationship between the two markers is not detected (OP22: No), then there is no operation relating to the player and no change in the positional relationship between the two markers in the captured image, and therefore the processing illustrated in FIG. 14 terminates.

At OP23, the control unit 55 judges whether or not there is condition information 584 of which the "condition" is satisfied, among the condition information 584 in the memory unit 58, on the basis of operational inputs from the operation analysis unit 14, the change content of the positional relationship between the two markers input from the positional relationship acquisition unit 53, and the positional relationship after change. If there is condition information 584 of which the "condition" is satisfied (OP23: Yes), then the processing advances to OP24. If there is no condition information 584 of which the "condition" is satisfied, then the processing illustrated in FIG. 14 is terminated.

At OP24, the control unit 55 executes the "action" defined in the condition information 584 of which the "condition" is satisfied. Thereafter, the processing illustrated in FIG. 14 terminates.

(Function and Effects of the First Embodiment)

In the first embodiment, if the predetermined condition is satisfied on the basis of the positional relationship between the markers on the board 2 and the operations relating to the player, and the like, then processing for superimposing information on the real space is executed. By this means, it is possible to diversify processing compared to processing for only displaying virtual objects corresponding to markers, and various changes and effects are applied to the virtual space, and hence the game is made more exciting.

Furthermore, in the first embodiment, since the board 2 has a plurality of markers, then even in a case where only a portion of the board 2 is captured in a zoom mode, provided that the captured image includes at least one marker on the board 2, the game device 1 is able to acquire the marker coordinates system of the marker and display a virtual object at the position corresponding to the marker. Moreover, even if a portion of a marker on the board 2 is missing from the captured image, the game device 1 is able to deduce the whole of the marker from the positional relationship with another marker which has been captured entirely in the image, and a virtual object is displayed at the position corresponding to the marker on the basis of this deduction. By this means, it is possible to raise the consistency between the virtual space and the real space.

(Modification of First Embodiment)

In the first embodiment, the game system 100 includes a player card 3, the player card 3 is moved in the real space by the user, and a game develops due to change in the position of the player card 3 on the board 2. On the other hand, in a modification example, the game system 100 does not include a player card 3, but instead includes an assistance card 3A having a marker. The assistance card 3A is a card for assisting the player and has a beneficial action for the player. The user is able to add, move and remove the assistance card 3A, on the board 2. In the game system 100 of the modification example, the player moves by means of the user operating an input device, such as the operating buttons 14 or the touch panel 13 of the game device 1, and the game develops on the basis of the movements of the player.

In the modification example, the marker processing unit 52 and the positional relationship acquisition unit 53 execute the same processing as the processing relating to the marker of the player card 3 in the first embodiment, in respect of the marker of the assistance card 3A. In other words, the marker processing unit 52 detects markers on the board 2 and the marker of the assistance card 3A, which are included in the captured image. Furthermore, the positional relationship acquisition unit 53 monitors the positional relationship between the assistance card 3A and the marker on the board 2, and acquires the change content in the positional relationship and the positional relationship after change. The control unit 55 determines the positional relationship between the assistance card 3A and the player object, judges whether or not the condition of the condition information 584 is satisfied on the basis of the positional relationship between the assistance card 3A and the player object, the change content in the positional relationship between the assistance card 3A and the marker on the board 2, or a combination of these, and if the condition is satisfied, executes the corresponding action.

Figure 15:
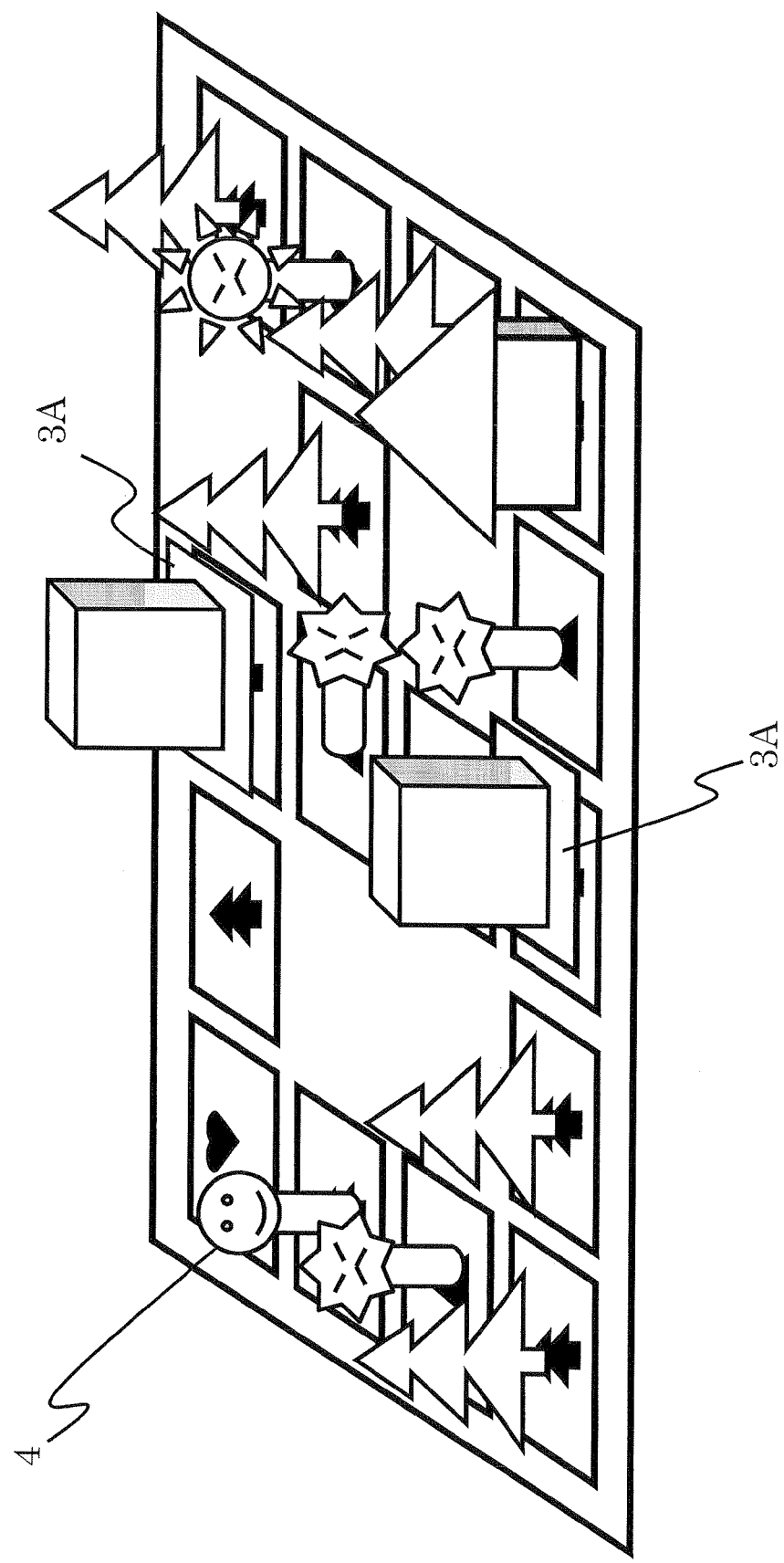
FIG. 15 shows an example non-limiting virtual space in a game system according to a modification example.

FIG. 15 is a diagram illustrating an example of the virtual space in a game system according to the modification example. In the example illustrated in FIG. 15, the virtual object corresponding to the marker of the assistance card 3A is a wall object. By arranging this assistance card 3A in a square adjacent to an enemy character object (the "condition" of the condition information 584), it is possible to prevent an attack from the enemy character object in the direction of the assistance card 3A (the "action" of condition information 584). There are various types of assistance cards 3A, and the markers and the virtual objects which are associated with the markers are different for each type of card.

FIG. 16 is a diagram depicting an example of condition information 584 in first game development processing according to the modification example. Similarly to the first game development processing of the first embodiment, the "condition" of the condition information 584 of the first game processing according to the modification example is set on the basis of the positional relationship between the assistance card 3A and the marker on the board 2, the positional relationship between the assistance card 3A and the player object 4, or a combination of these. Furthermore, similarly to the first game development processing of the first embodiment, processing for superimposing information on the real space is set as the "action" in the condition information 584.

In the condition information 584 having condition ID "21", the fact that the marker of the assistance card 3A is overlapping with the marker of a house object is set as the "condition" and restoration of the player's strength is defined as the "action".

In the condition information 584 having condition ID "22", the fact that the marker of the assistance card 3A is positioned at (overlaps with) a square where the player is positioned is set as the "condition" and a rise in the level of the player is defined as the "action".

In the condition information 584 having condition ID "23", the fact that the marker of the assistance card 3A is positioned at a square adjacent to the marker of an enemy character object is set as the "condition" and defense against an attack by the enemy character object is defined as the "action".

Figure 17:
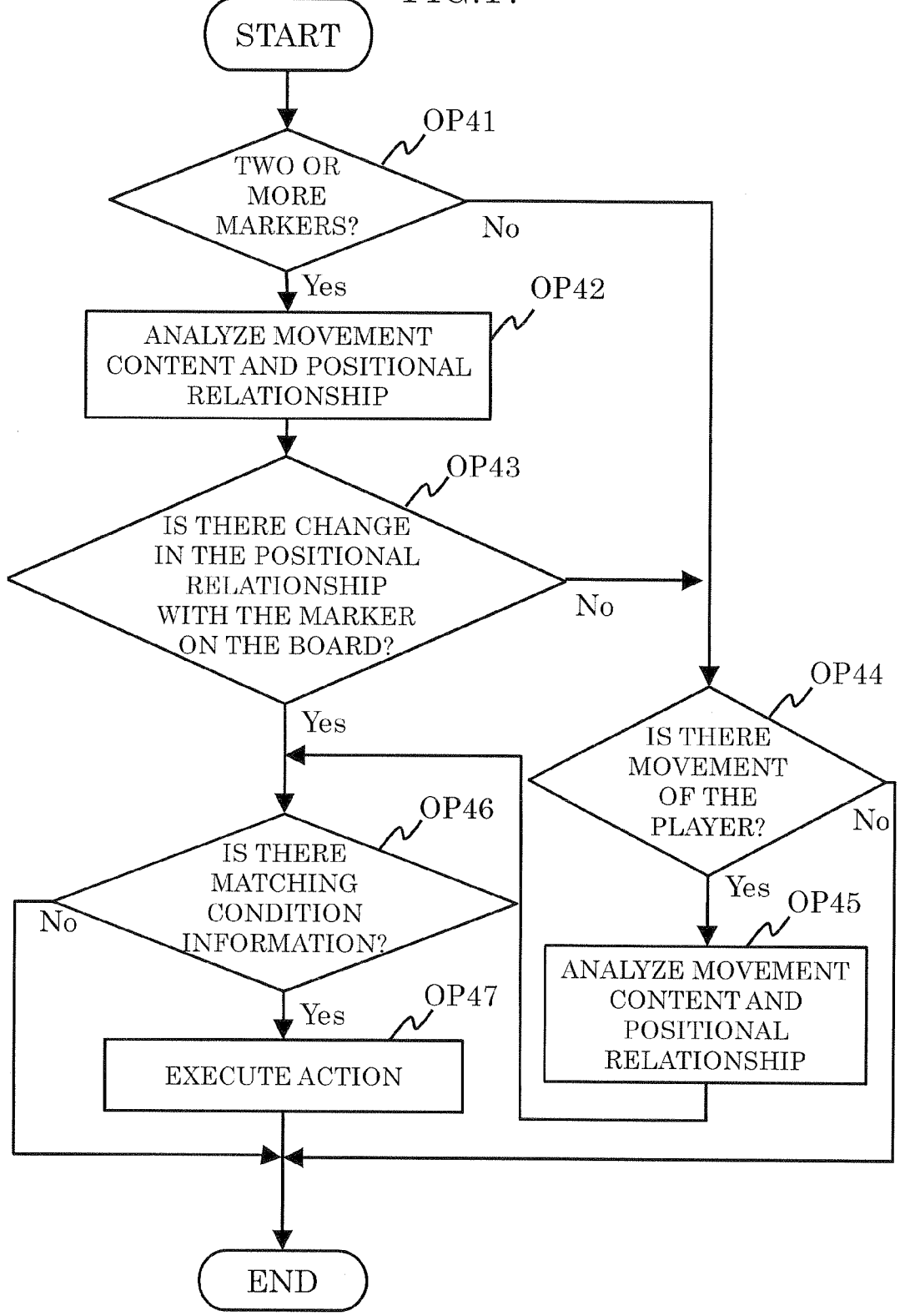
FIG. 17 shows an example non-limiting flowchart of second game development processing in the modification example.

FIG. 17 is an example of a flowchart of first game development processing in the modification example. The processing depicted in FIG. 17 is started together with the start of a game. Furthermore, the processing depicted in FIG. 17 is executed repeatedly at predetermined cycles, until the game ends.

The processing in OP41 to OP43 is similar to the processing in OP11 to OP13 in FIG. 11. More specifically, the positional relationship acquisition unit 53 carries out processing for detecting change in the positional relationship between the assistance card 3A and the marker on the board 2.

At OP44, the control unit 55 judges whether or not there is movement of the player object. The control unit 55 performs this judgment on the basis of the content of inputs from the operation analysis unit 54. If there is movement of the player object (OP44: Yes), then the processing advances to OP45. If there is no movement of the player object (OP44: No), then the processing illustrated in FIG. 17 terminates.

At OP45, the control unit 55 analyzes the content of the movement of the player object, and the positional relationship between the marker of the assistance card 3A and the player object after change. The control unit 55 analyzes the content of movement of the player object on the basis of inputs from the operation analysis unit 54. The control unit 55 analyzes the positional relationship between the marker of the assistance card 3A and the player object after change, on the basis of the marker of the assistance card 3A which is input from the marker detection unit 52 and the content of movement of the player object.

At OP46, the control unit 55 judges whether or not there is condition information 584 of which the "condition" has been satisfied, on the basis of the positional relationship between the marker of the assistance card 3A and the marker on the board 2, the positional relationship between the marker of the assistance card 3A and the player object, or a combination of these. If there is condition information 584 of which the "condition" is satisfied (OP46: Yes), then the processing advances to OP47. If there is no condition information 584 of which the "condition" is satisfied, then the processing illustrated in FIG. 17 is terminated.

At OP47, the control unit 55 executes the "action" defined in the condition information 584 of which the condition is satisfied. Thereafter, the processing illustrated in FIG. 17 terminates.

In the modification example, the second game development processing employs the same processing as that of the second game development processing in the first embodiment. In other words, the second game development processing of the first embodiment is applied both in cases where movement of the player object in the virtual space is implemented by movement of the player card 3 by the user and in cases where movement of the player object in the virtual space is implemented by means of an operational signal from an input device, such as the operating buttons 14 and the touch panel 13 of the game device 1, or the like. Furthermore, in the second game development processing of the modification example, it is possible to use the positional relationship between the assistance card 3A and the player object 4, or a marker on the board 2, or change in this positional relationship, in the "condition" setting of the condition information 584.

In the game device 1 according to the modification example, a player object 4 which does not exist in the real space moves over the board 2 on the display screen, due to the operation of the input devices such as the operating buttons 14, the touch panel 13, and the like. By this means, it is possible for the user to perceive a player object 4, which does not exist in the real space, moving on the board 2 which does exist in the real space. Moreover, by arranging an auxiliary card 3A on the board 2 which is present in the real space, it is possible to apply actions or effects to virtual objects which are present in the virtual space. By this means, the game device 1 is able to present the user with a world of enhanced reality in which the real space and the virtual space are better blended together.

<Second Embodiment>

It is an object of the second embodiment to provide an information processing system, an information processing method, an information processing device and a tangible recording medium recording an information processing program whereby consistency between a plurality of information processing devices is improved in respect of change in state of a virtual space which corresponds to a real space captured by an imaging device.

The second embodiment is described in relation to game development processing in a case where the game system described in relation to the first embodiment includes a plurality of game devices 1. If a virtual space presented by a game system is shared by a plurality of game devices 1, then it is needed to maintain the consistency of information between the plurality of game devices 1. In the second embodiment, wireless communication is used in order to maintain consistency of information between the plurality of game devices 1. In the second embodiment, the movement of a player object 4 in the virtual space may be implemented by a user of the respective game devices 1 changing the arrangement of the player card 3, or may be implemented by an operational signal from an input device, such as the operating buttons 14, touch panel 13, and the like, of the respective game devices 1.

In the second embodiment, for example, the game device 1 uses the wireless communication module 36 to perform wireless communication in IEEE 802.11. b/g ad hoc mode, with another game device 1 located within a predetermined range, without routing via a relay device, such as a server or access point.

In the second embodiment, if there has been change in the virtual space within the captured image(the imaging range) of one game device (home device) 1, then the control unit 55 sends the content of this change to the other game device 1, as update information, via the wireless communication module 36. The update information includes information about the updated virtual objects and squares, and the content of the update. For example, the update information is the differential change in the game development status information 585 due to the update. Furthermore, the control unit 55 of the game device 1 receives update information from other game device 1, via the wireless communication module 36.

The information consistency processing which is executed by the game device 1 upon receiving update information is divided into the processes (A) to (C) described below, depending on the content of the update information received from the other game device 1 and the markers included in the captured image of the home device.

(A) When the received update information includes information about the same marker as a marker included in the captured image (imaging range) of the game device in question, then the control unit 55 checks consistency on the basis of the update information received in relation to the marker and the information (game development status information 585) held by that game device. Checking consistency means, for example, that each of a plurality of game devices 1 respectively reports change in the information held by that game device 1, as update information, to the other game devices 1, and each game device receiving such a report reflects the reported update information in the information it holds.

(B) If the received update information does not include information about a marker that is the same as a marker included in the captured image (imaging range) of the game device in question, and does not include information relating to a marker included in the captured image of that game device, then the control unit 55 updates the game development status information 585 with the change content included in the received update information.

Figure 18:
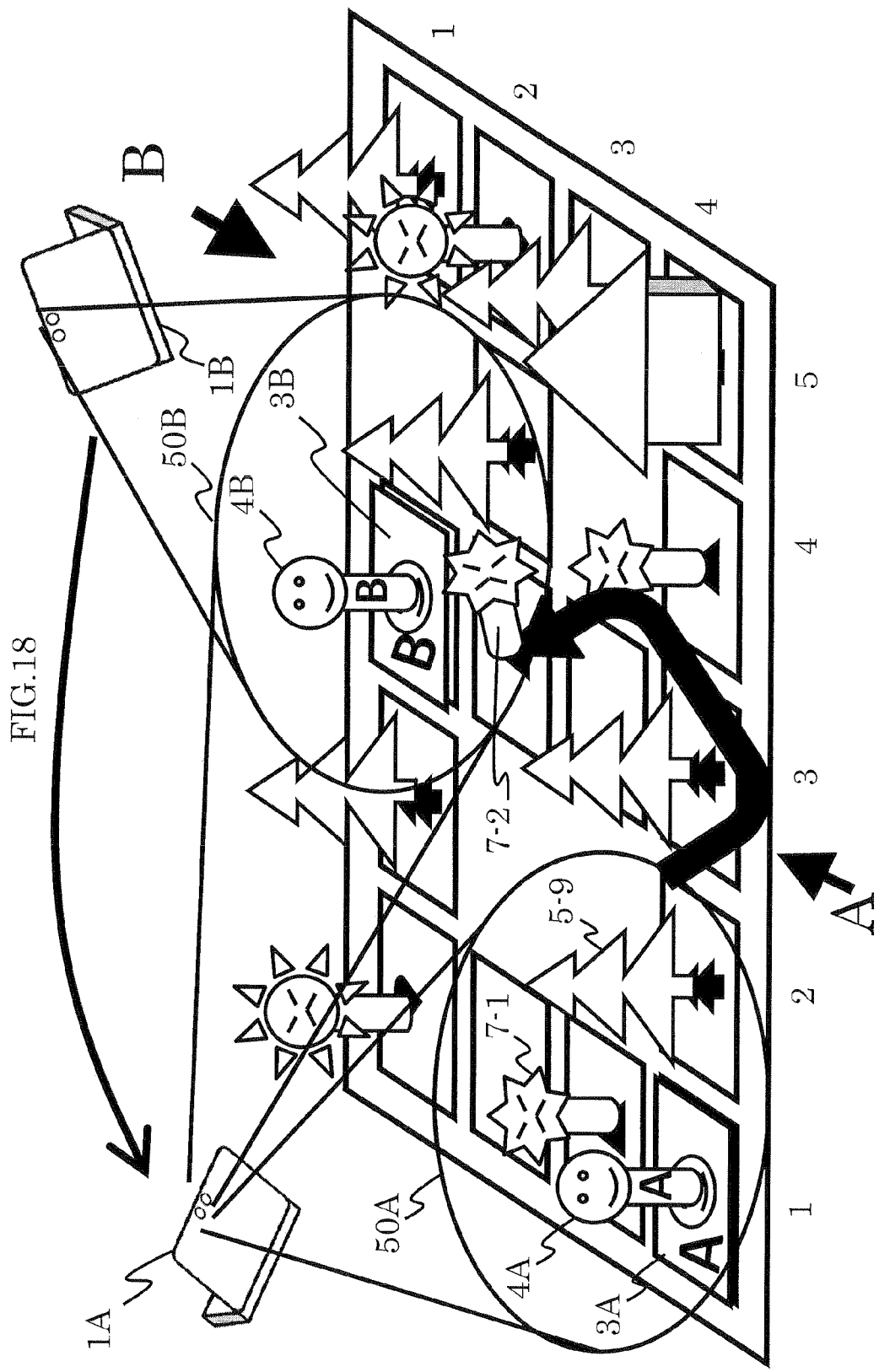
FIG. 18 shows a diagram for describing one example of update information reception processing.

FIG. 18 is a diagram for describing one example of update information reception processing. FIG. 18 illustrates a case where the reception process in (B) above is carried out. In the example illustrated in FIG. 18, a game is played by two game devices, game device 1A and game device 1B. The player cards 3A and 3B on the board 2 are player cards used respectively by the users of the game devices 1A and 1B. The game device 1A captures an image in an imaging range 50A. The game device 1B captures an image in an imaging range 50B.

In the example illustrated in FIG. 18, it is supposed that a character object 4B which is operated by the game device 1B fights and defeats an enemy character object 7-2, and the enemy character object 7-2 has fallen. In this case, in the game device 1B, change has occurred in the virtual space in the imaging range 50B of that game device, and therefore this change is recognized. More specifically, in the game device 1B, this change is updated in the game development status information 585, and the enemy character object 7-2 is displayed in a fallen state.

On the other hand, in the game device 1A, the change which has occurred in the imaging range 50B (the fact that the enemy character object 7-2 is in a fallen state) is a change that has occurred outside the imaging range of the game device 1A, and therefore this change is not recognized in the game device 1A. More specifically, if the imaging range of the game device 1A has been moved from the imaging range 50A to the imaging range 50B, then the game device 1A does not recognize the fact that the enemy character object 7-2 is in a fallen state, and therefore the game device 1A displays the enemy character object in a standing state. In this case, there is inconsistency between the virtual space displayed on the game device 1A and the virtual space displayed on the game device 1B.

Therefore, the game device 1B sends the fact that the state of the enemy character object 7-2 has changed, to the game device 1A, as update information. By this means, the game device 1A is able to recognize that the enemy character object 7-2 has changed to a fallen state. When the game device 1A projects the imaging range to the imaging range 50B, then the enemy character object 7-2 is displayed in a fallen state on the game device 1A.

Figure 19A:
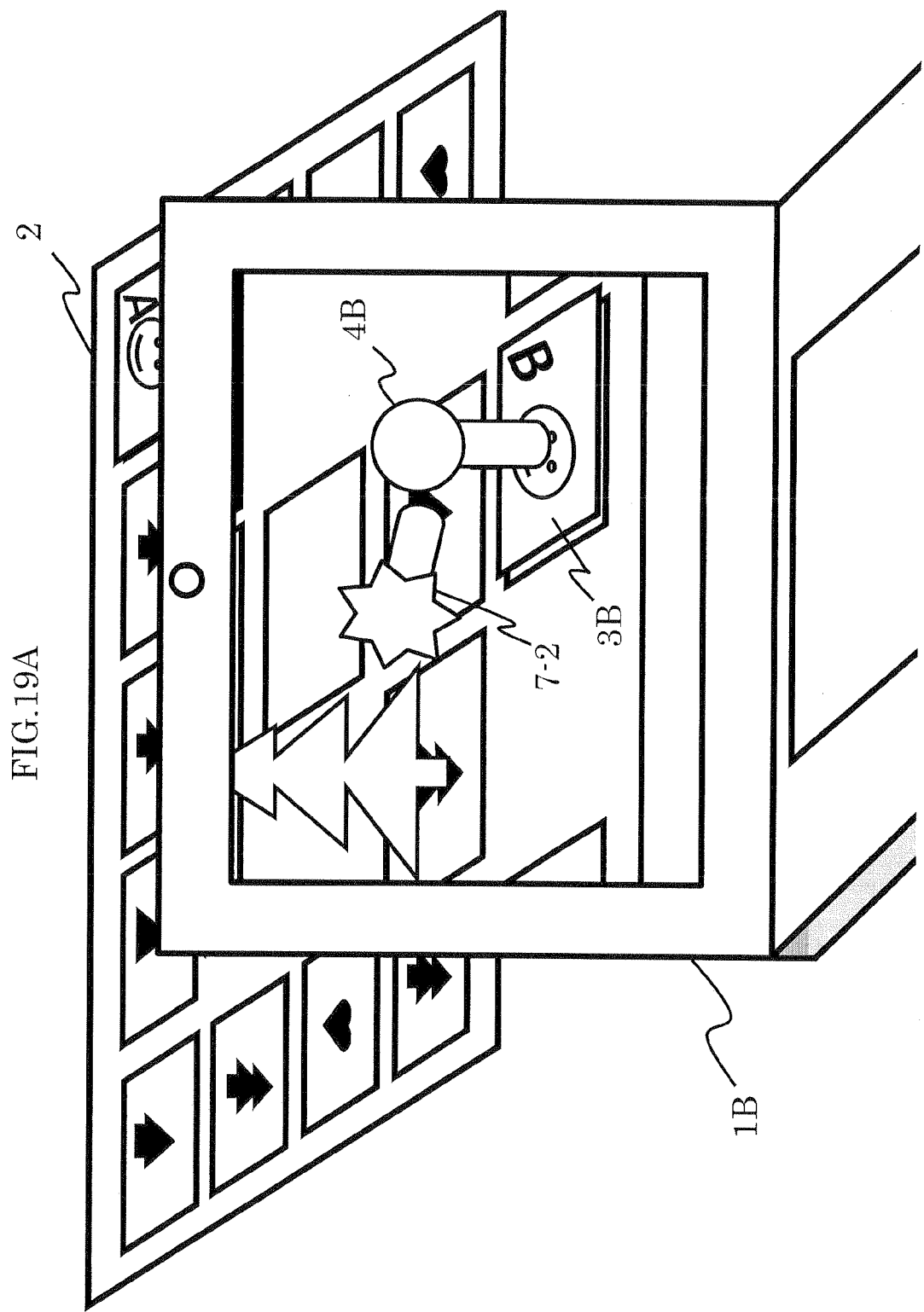
FIG. 19A shows an example non-limiting screen display of a game device 1B after information consistency processing has been executed.

FIG. 19A is a diagram depicting a display on the screen of the game device 1B after information consistency processing has been executed in the example depicted in FIG. 18. FIG. 19B is a diagram depicting a display on the screen of the game device 1A after information consistency processing in the example depicted in FIG. 18. In the example illustrated in FIG. 18, the imaging direction of the game device 1A is the direction indicated by arrow A. Furthermore, the imaging direction of the game device 1B is the direction indicated by arrow B. Moreover, in the example illustrated in FIG. 18, for instance, all of the virtual objects are facing the direction of arrow B, in other words, toward the front side in the case of game device 1A and toward the rear side in the case of game device 1B.

On the screen of the game device 1B which is illustrated in FIG. 19A, the enemy character object 7-2 is displayed in a fallen state. Furthermore, the rear surfaces of the respective virtual objects are displayed on the screen of the game device 1B.

On the screen of the game device 1A which is illustrated in FIG. 19B, the enemy character object 7-2 is displayed in a fallen state due to receiving update information from the game device 1B. Furthermore, the front surfaces of the respective virtual objects are displayed on the screen of the game device 1A. In other words, consistency of information in terms of the mode, orientation, and the like, of the virtual objects, is achieved between the game device 1A and the game device 1B. The orientation of the virtual objects is an example and the virtual objects face in various directions, as the game progresses.

(C) If the received update information does not include information about a marker that is the same as a marker included in the captured image (imaging range) of the game device in question, but includes information relating to a marker included in the captured image of that game device, then the control unit 55 executes processing for producing predetermined effects in the virtual space, in accordance with the change content included in the received update information. The information relating to a marker included in the captured image of the game device in question is, for example, an update content of update information in which a virtual object corresponding to a marker which is included in the captured image of the game device in question is designated as a virtual object for which change in the figure or state is instructed in conjunction with change in the figure or state of the virtual object which is being updated.

Figure 20:
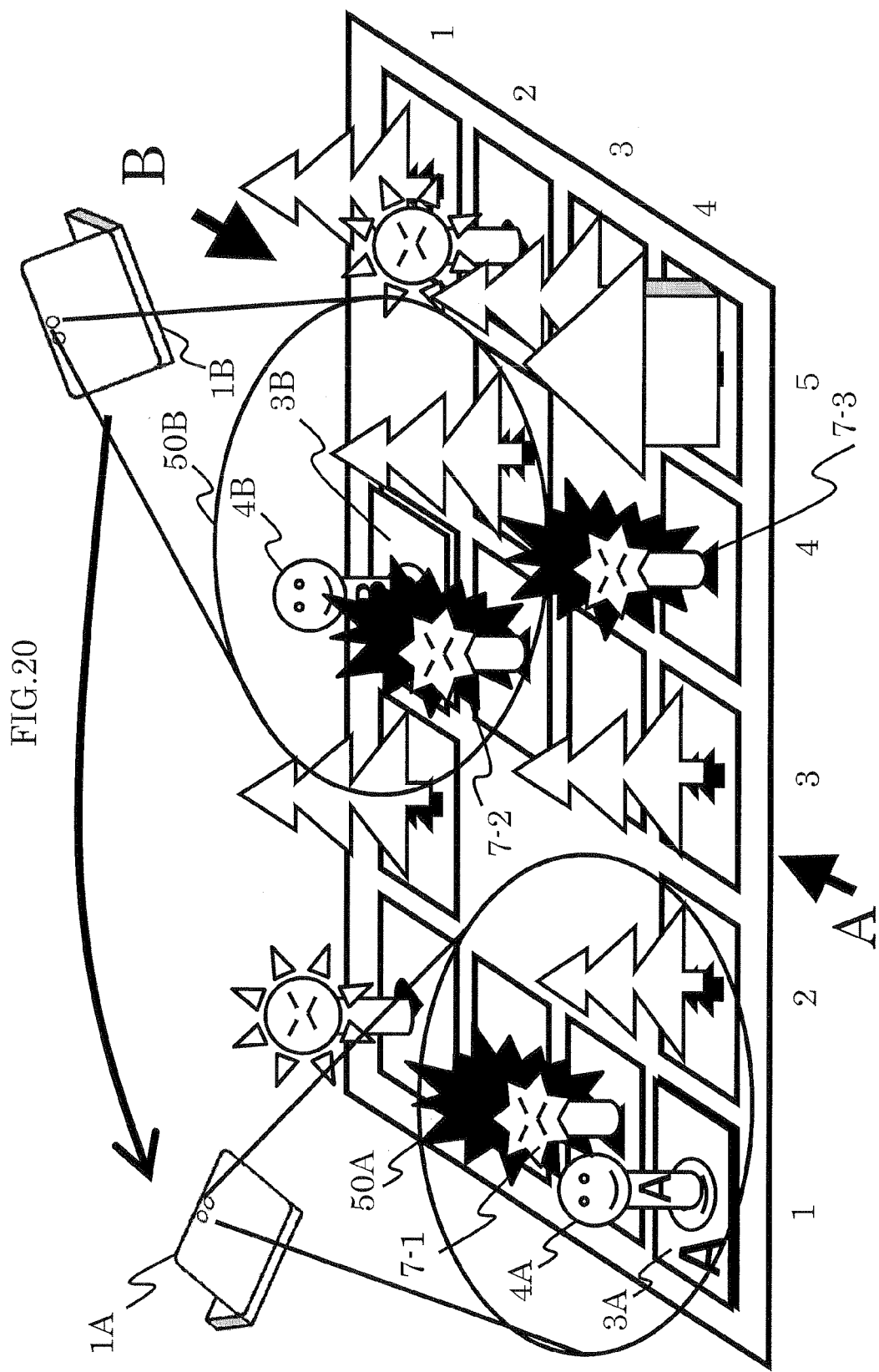
FIG. 20 shows a diagram for describing one example of update information reception processing.

FIG. 20 is a diagram for describing one example of update information reception processing. FIG. 20 illustrates a case where the reception process in (C) above is carried out. FIG. 20 depicts the same virtual space as the example illustrated in FIG. 18.

In the example illustrated in FIG. 20, when a character object 4B operated by the game device 1B has fought and defeated the enemy character object 7-2, then enemy character objects 7-1, 7-3 which are of the same type also explode, in addition to the enemy character object 7-2. In this case, since the fact that the character object 4B has defeated the enemy character object 7-1 has occurred in the imaging range 50B of the game device 1B, then the game device 1B is able to detect this. In other words, the screen of the game device 1B which captures an image of the imaging range 50B displays a situation where the character object 7-2 explodes.

On the other hand, in the game device 1A, the change which has occurred in the imaging range 50B (the enemy character object 7-2 exploding), is a change that has occurred outside the imaging range of the game device 1A, and therefore this change is not perceived in the game device 1A. Therefore, the enemy character object 7-1 that ought to explode, which is included in the imaging range 50A of the game device 1A, does not explode on the screen of the game device 1A. In this case, there is inconsistency between the virtual space displayed on the game device 1A and the virtual space displayed on the game device 1B.

Therefore, the game device 1B sends the fact that the state of the enemy character object 7-2 has changed, to the game device 1A, as update information. By this means, the game device 1A is able to recognize that the enemy character object 7-2 explodes, and that the enemy character object 7-1 explodes as well. Consequently, the enemy character object 7-1 explodes on the screen of the game device 1A which captures images in the imaging range 50A.

Figure 21B:
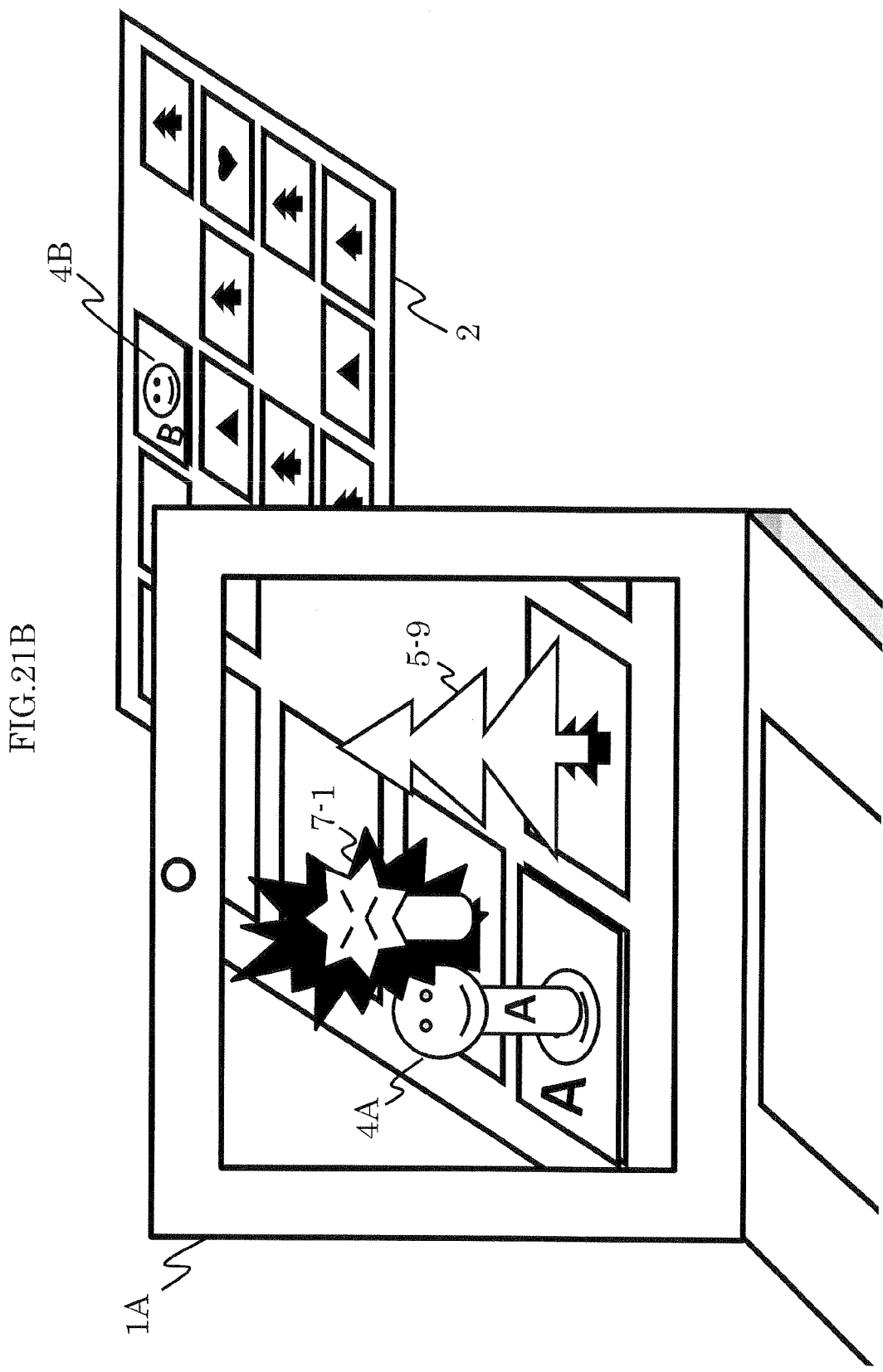
FIG. 21B shows an example non-limiting screen display of a game device 1A which captures images in an imaging range 50A, after information consistency processing has been executed.

FIG. 21A is a diagram depicting a display on the screen of the game device 1B which captures images in the imaging range 50B, after information consistency processing has been executed in the example depicted in FIG. 20. FIG. 21B is a diagram depicting a display on the screen of the game device 1A which captures images in the imaging range 50A, after information consistency processing has been executed in the example depicted in FIG. 20. In the example illustrated in FIG. 20, the imaging direction of the game device 1A is the direction indicated by arrow A. Furthermore, the imaging direction of the game device 1B is the direction indicated by arrow B. Moreover, in the example illustrated in FIG. 20, for instance, all of the virtual objects are facing in the direction of arrow B.

On the screen of the game device 1B that captures the imaging range 50B, which is illustrated in FIG. 21A, the enemy character object 7-2 is displayed in an exploded state. Furthermore, the rear surfaces of the respective virtual objects are displayed on the screen of the game device 1B.

On the screen of the game device 1A that captures the imaging range 50A which is illustrated in FIG. 21B, the enemy character object 7-1 is displayed in an exploded state due to receiving update information from the game device 1B. Furthermore, the front surfaces of the respective virtual objects are displayed on the screen of the game device 1A. In other words, consistency of information in terms of the mode, orientation, and the like, of the virtual objects, is achieved between the game device 1A and the game device 1B.

Figure 22:
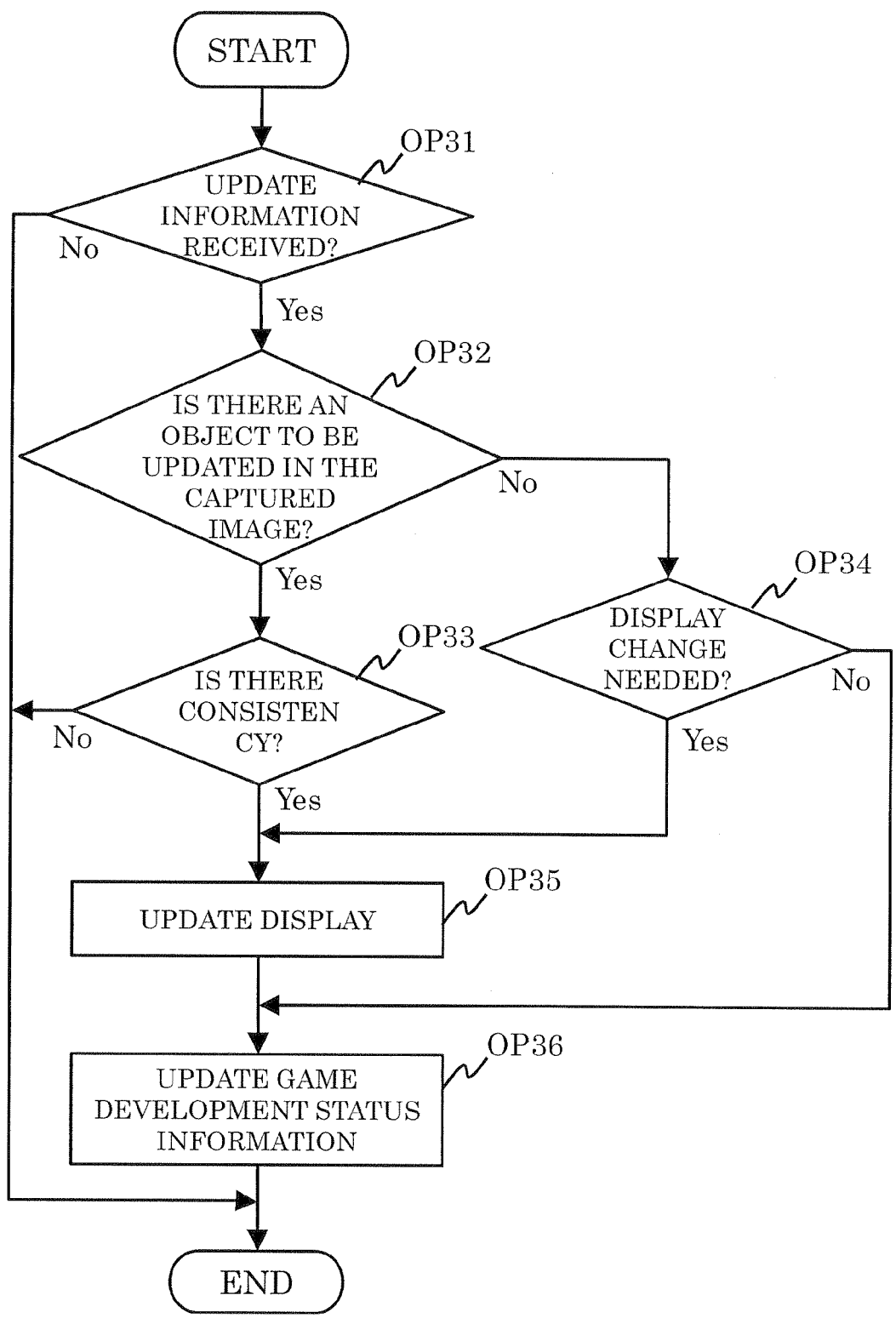
FIG. 22 shows an example non-limiting flowchart of information consistency processing when update information is received.

FIG. 22 is an example of a flowchart of information consistency processing when update information is received. The processing depicted in FIG. 22 is started together with the start of a game. Furthermore, the processing depicted in FIG. 22 is executed repeatedly at predetermined cycles, until the game ends.

At OP31, the control unit 55 judges whether or not update information has been received. If update information has been received (OP31: Yes), then the processing advances to OP32. If update information has not been received (OP31: No), then the processing illustrated in FIG. 22 terminates.

At OP32, the control unit 55 judges whether or not the virtual object being updated and which is included in the received update information is included in the captured image. If the virtual object being updated is included in the captured image (OP32: Yes), then the process in (A) above is executed, and processing then advances to OP33. If the virtual object being updated is not included in the captured image, then processing advances to OP34.

At OP33, the control unit 55 judges whether or not there is consistency between the received update information and the game development status information held by the game device. If there is consistency (OP33: Yes), then the processing advances to OP35. If there no consistency (OP33: No), then the processing illustrated in FIG. 22 terminates. In this case, the control unit 55 may update the game development status information in accordance with the update information and may send an inconsistency report to the game device 1 that sent the update information. In the game device 1 which has received the inconsistency report, the user may be instructed to capture an image of the whole of the board 2, the transmission of game development status information may be requested from the other game devices 1, and the game device 1 itself may regenerate game development status information 855 anew.

At OP34, the control unit 55 judges whether or not the change content included in the update information is related to a virtual object included in the captured image. If the change content included in the update information is related to the virtual object included in the captured image (OP34: Yes), then the processing in (C) described above is executed, and therefore the processing advances to OP35. If the change content included in the update information has no relation to the virtual object included in the captured image (OP34: No), then the processing in (B) described above is executed, and therefore the processing advances to OP36.

At OP35, the control unit 55 carries out processing in accordance with the update information. At OP 36, the control unit 55 updates the game development status in accordance with the update information. Thereafter, the processing illustrated in FIG. 22 terminates.

Note that, at OP32, if the virtual object that is being updated is included in the captured image (OP32: Yes), then it is also possible to advance processing to OP35, without executing the processing in OP33. This is because game development is also implemented by a method in which, when update information is exchanged between two game devices 1, for example, then change in the information generated in one of the two game devices 1 is received directly by the other one of the two game devices 1.

(Function and Effects of the Second Embodiment)

In the second embodiment, if a virtual space is shared by a plurality of game devices 1, then when change is detected in the virtual space within the imaging range, update information is sent to the other game device. By this means, the game device 1 is able to recognize change that has occurred in the virtual space outside of the imaging range of that game device 1. Accordingly, it is possible to maintain the consistency of information between a plurality of game devices 1 which share a virtual space. Furthermore, it is possible to make the virtual space shared by the plurality of game devices 1 more exciting, by also changing the state of the objects within the captured image, in conjunction with the change that has occurred outside of the imaging range of a particular game device 1 itself, as in (C) described above.

According to the second embodiment, it is possible to improve consistency between a plurality of information processing devices in respect of change in the state of a virtual space corresponding to a real space of which images are captured by an imaging device.

(Modification of Second Embodiment)

The second embodiment described an example in which a game is played by a plurality of game devices 1 each capturing an image of the same board 2 and generating a common virtual space. Instead of this, it is also possible to play a game in which the respective game devices 1 are situated in separate positions, and generate a common virtual space by capturing an image of a board 2 of the same type at their respective locations. In this case, in each board 2 which is an imaging object of the respective game devices 1, the plurality of printed squares need to be squares of the same shape arranged in the same configuration in each board 2. Apart from this, for example, it is also acceptable to vary the background color of the board 2, or to vary the design provided about the periphery of the arrangement of squares. Furthermore, in cases of this kind, a user prepares a board 2 of the same type, and by communicating via an access point or a server using the wireless communication function of the game device 1, is able to play a game by sharing the same virtual space with a user of a game device 1 which is situated in a remote location.

(Other Aspects)

In the first embodiment and the second embodiment, a case of using a portable game device 1 is described, but it is also possible to realize the present disclosure by executing the image processing program of the present disclosure in a stationary game device, which is a device that is independent of the imaging device and the display device, or in an information processing device such as a generic personal computer. Furthermore, in another embodiment, the device is not limited to a game device, and may be any portable electronic device, such as a PDA(Personal Digital Assistant), mobile telephone, personal computer, camera, or the like.

Moreover, in the descriptions given above, an example of executing game development processing in a game device 1 is used, but at least a portion of the processing steps of the game development processing may be executed in another device. For example, if a game device 1 performs communication with another device (for example, a server or another game device), then the processing steps in the game development processing described above may be executed by coordinated operation of the game device 1 and the other device. For instance, another device may execute the processing of the marker detection unit 52, the positional relationship acquisition unit 53 and the control unit 55. In this way, by executing at least a portion of the processing steps of the game development processing in another device, it is possible to achieve similar processing to the game development processing described above. Thus, the game development processing described above is executed by coordinated operation of one processor or a plurality of processors included in an information processing system constituted by at least one information processing device. Furthermore, in the embodiment described above, processing according to the flowchart described above is carried out by means of the information processing unit 31 of the game device 1 executing a predetermined program, but it is also possible to carry out all or a portion of the processing by means of a dedicated circuit provided in the game device 1.

Moreover, the form of the game device 1 described above, and the form, number and arrangement positions of the operating buttons 14, analog stick 15, touch panel 13, and the like, provided in the game device 1, are merely examples and it is of course possible to realize the present disclosure using other forms, numbers and arrangement positions. Furthermore, the processing sequence, the set values and the values for judgment, and the like, in the image processing described above are merely examples and the present disclosure is of course realized using other sequences and values.

Furthermore, the game program described above may also be supplied to the game device 1 via a wired or wireless communication circuit, apart from being supplied to the game device 1 via an external storage medium, such as an external memory 45, external data memory 46, or the like. Moreover, the program described above may be recorded previously in a non-volatile storage device inside the game device 1. Apart from a non-volatile memory, the information storage medium which stores the program may be an optical disk-shaped recording medium, such as a CD-ROM, DVD or similar medium, or a flexible disk, a hard disk, a magneto-optical disk, magnetic tape, or the like. Furthermore, the information storage medium which stores the program may be a non-volatile memory which temporarily stores the program. An external storage medium of this kind may be a recording medium that is read by a computer, or the like. For instance, it is possible to provide functions of various types as described above, by reading in and executing the program on the recording medium in a computer, or the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

Furthermore, it is understood that a person skilled in the art could implement an equivalent scope of technology on the basis of the description of the present disclosure and their technical knowledge, from the description of the concrete embodiments of the present disclosure. Moreover, unless specified otherwise, terminology used in the present specification is used with the meaning normally employed in the related field. Therefore, unless defined otherwise, all specialist terms and technical terms used in the present specification have the same meaning as that generally understood by a person skilled in the related art to which the present embodiments belongs. In the case of any contradictions, the present specification (including definitions) takes priority.

What is claimed is:

1. An information processing system which includes a plurality of information processing devices, and in which the respective information processing devices carry out imaging by an imaging device, wherein
the respective information processing devices comprises:
a imaging processor configured to generate a capture image by sequentially capturing images of a real space by the imaging device;
a virtual space setter configured to set a virtual space commonly used by another information processing device which captures an image of one of an imaging object that is included in a capture image generated by the imaging processor, and an imaging object, at least a portion of external appearance of which matches the imaging object, based on at least the portion of the imaging object included in the captured image;

a transmitter configured to send data relating to change in a state of the virtual space set by the virtual space setter, to the other information processing device, when the change in the state of the virtual space is detected; and a marker which is present in a real space and has a shape enabling detection of a position and an attitude at the position, wherein the respective information processing devices further comprise a detector configured to detect the position and attitude of the marker in the captured image generated by the imaging processor;

the virtual space setter generates the virtual space based on at least the position and attitude of the marker detected by the detector, and the transmitter, when the position or attitude of the marker changes and the change in the state of the virtual space set by the virtual space setter is detected, sends data relating to the change in the state of the virtual space, to the other information processing device.

2. The information processing system according to claim 1, wherein the transmitter is configured to judge whether or not the state of the virtual space set by the virtual space setter changes from a previously set state, and send data relating to the change in the state of the virtual space, to the other information processing device, when the state of the virtual space is judged to have changed.

3. The information processing system according to claim 1, wherein the transmitter, when change in the state of the virtual space set by the virtual space setter is detected due to the change in the position or attitude of the marker, sends data relating to change in the position and attitude of the marker, to the other information processing device.

4. The information processing system according to claim 3, wherein the virtual space setter includes a display processor configured to superimpose predetermined data on the captured image and displays the image on the display device at a position corresponding to the marker based on the attitude of the marker.

5. The information processing system according to claim 4, wherein
the respective information processing devices further comprise a receiver configured to receive data relating to the change in the position and attitude of the marker from the other information processing device, and
the display processor changes and displays the state of the predetermined data, based on data relating to the position and attitude of the marker received by the receiver.

6. The information processing system according to claim 1, wherein
the respective information processing devices further comprise a receiver configured to receive data relating to the change in the state of the virtual space sent from the other information processing device, and
the virtual space setter generates the virtual space also based on data relating to the change received by the receiver.

7. The information processing system according to claim 1, wherein
the respective information processing devices further comprise an operational input acceptor configured to accept an operational input from a user, and
the virtual space setter generates the virtual space based on the operational input.

8. The information processing system according to claim 1, wherein the transmitter sends data relating to the change in the state of the virtual space to the other information processing device, without routing via a relay device.

9. An information processing method executed by each of a plurality of information processing device included in information processing system, the respective information processing devices carrying out imaging by an imaging device, the information processing method comprising:
generating a captured image by sequentially capturing images of a real space by the imaging device;
setting a virtual space commonly used by another information processing device which captures an image of one of an imaging object that is included in the generated captured image, and an imaging object, at least a portion of an external appearance of which matches the imaging object, based on at least the portion of the imaging object included in the captured image; and
sending data relating to change in a state of a virtual space, to the other information processing device, when the change in the state of the virtual space is detected;
detecting a position and an attitude of a marker in the generated captured image, the marker being present in a real space and having a shape enabling detection of the position and the attitude at the position; wherein
the setting of the virtual space includes generating the virtual space based on at least the detected position and attitude of the marker; and
the data relating to the change in the state of the virtual space is sent to the other information processing device when the position or attitude of the marker changes and the change in the state of the set virtual space is detected.

10. An information processing device, comprising a computer processor, the information processing device being at least configured to:
generate a captured image by sequentially capturing images of a real space by an imaging device;
set a virtual space commonly used by another information processing device which captures an image of one of an imaging object that is included in a generated captured image, and an imaging object, at least a portion of an external appearance of which matches the imaging object, based on at least the portion of the imaging object included in the captured image; and
send data relating to change in a state of a set virtual space, to the other information processing device, when the change in the state of the virtual space is detected;
detect a position and an attitude of a marker in the generated captured image, the marker being present in a real space and having a shape enabling detection of the position and the attitude at the position; wherein
the setting of the virtual space includes generation of the virtual space based on at least the detected position and attitude of the marker; and
the data relating to the change in the state of the set virtual space is to be sent to the other information processing device when the position or attitude of the marker changes and the change in the state of the set virtual space is detected.

11. The information processing device according to claim 10, wherein the processing device is further configured to judge whether or not the set state of the virtual space changes from a previously set state, and send data relating to the change in the state of the virtual space, to the other information processing device, when the state of the virtual space is judged to have changed.

12. The information processing device according to claim 10, wherein the processing device is further configured to, when change in the set state of the virtual space is detected due to the change in the position or attitude of the marker, send data relating to change in the position and attitude of the marker, to the other information processing device.

13. The information processing device according to claim 10, wherein the processing device is further configured to receive data relating to the change in the state of the virtual space sent from the other information processing device, and generate the virtual space also based on the received data relating to the change.

14. A non-transitory recording medium recording an information processing program executed by computers of respective information processing devices in an information processing system which includes a plurality of information processing devices, and in which the respective information processing devices carry out imaging by an imaging device, the program causing the respective computers to provide functionality comprising:

an imaging processing to generate a captured image by sequentially capturing images of a real space by the imaging device;

a virtual space setting to set a virtual space commonly used by another information processing device which captures an image of one of an imaging object that is included in a captured image generated by the imaging processing, and an imaging object, at least a portion of an external appearance of which matches the imaging object, based on at least the portion of the imaging object included in the captured image; and a transmission to send data relating to change in a state of a virtual space set by the virtual space setting, to the other information processing device, when the change in the state of the virtual space is detected;

a detection of a position and an attitude of a marker in the captured image generated by the imaging processing, the marker being present in a real space and having a shape enabling detection of the position and the attitude at the position; wherein:

the setting of the virtual space includes generation of the virtual space based on at least the detected position and attitude of the marker; and the data relating to the change in the state of the virtual space is to be sent to the other information processing device when the position or attitude of the marker changes and the change in the state of the set virtual space is detected.

* * * * *